United States Patent
Toyomura et al.

(10) Patent No.: US 8,390,724 B2
(45) Date of Patent: Mar. 5, 2013

(54) IMAGE CAPTURING DEVICE AND NETWORK CAMERA SYSTEM

(75) Inventors: Yuuji Toyomura, Fukuoka (JP); Nobuhiro Tsuchihashi, Fukuoka (JP); Toshihiko Mitsuse, Fukuoka (JP)

(73) Assignee: Panasonic Corporation, Osaka (JP)

( * ) Notice: Subject to any disclaimer, the term of this patent is extended or adjusted under 35 U.S.C. 154(b) by 242 days.

(21) Appl. No.: 12/917,934

(22) Filed: Nov. 2, 2010

(65) Prior Publication Data

US 2011/0102606 A1    May 5, 2011

(30) Foreign Application Priority Data

Nov. 5, 2009 (JP) ................................ 2009-253641
May 12, 2010 (JP) ................................ 2010-109867

(51) Int. Cl.
*H04N 5/225* (2006.01)
*G02B 1/06* (2006.01)
(52) U.S. Cl. ......... 348/335; 348/340; 359/665; 359/666
(58) Field of Classification Search .................. None
See application file for complete search history.

(56) References Cited

U.S. PATENT DOCUMENTS

| | | | | |
|---|---|---|---|---|
| 2006/0067663 A1* | 3/2006 | Kita | ................. | 396/72 |
| 2006/0244930 A1* | 11/2006 | Hayashi et al. | ................. | 353/97 |
| 2007/0127135 A1* | 6/2007 | Nagasaka | ................. | 359/665 |
| 2007/0159535 A1* | 7/2007 | Kumagai et al. | ........... | 348/218.1 |
| 2010/0111489 A1* | 5/2010 | Presler | .............. | 386/52 |
| 2010/0220200 A1* | 9/2010 | Otake | ........................ | 348/208.4 |
| 2010/0261158 A1* | 10/2010 | Nordman et al. | ................. | 435/6 |
| 2011/0019112 A1* | 1/2011 | Dolgoff | ............................ | 349/8 |
| 2012/0069238 A1* | 3/2012 | Toyomura et al. | ............. | 348/340 |
| 2012/0105600 A1* | 5/2012 | Meyer et al. | .................... | 348/50 |
| 2012/0121193 A1* | 5/2012 | Lipson et al. | ................. | 382/218 |

FOREIGN PATENT DOCUMENTS

| | | |
|---|---|---|
| JP | 2000-125170 | 4/2000 |
| JP | 2000278614 | * 6/2000 |
| JP | 2000-278614 | 10/2000 |
| JP | 2008-306492 | 12/2008 |

OTHER PUBLICATIONS

English Translation of JP 2000278614.*

* cited by examiner

*Primary Examiner* — Lin Ye
*Assistant Examiner* — John H Morehead, III
(74) *Attorney, Agent, or Firm* — Greenblum & Bernstein, P.L.C.

(57) ABSTRACT

An image capturing device includes an image capturing element that performs photoelectric conversion of light from an object and outputs a pixel signal, a lens unit that forms images on the image capturing element based on light from the object, and an optical shift mechanism that displaces optical images formed on a light-receiving surface of the image capturing element relative to the image capturing element. The optical shift mechanism has an optical member provided with a parallel plate that is inclined at a predetermined angle with respect to the optical axis of the lens unit and rotated around the optical axis. The optical member is provided in a fluid having a higher refractive index than a refractive index of air.

20 Claims, 22 Drawing Sheets

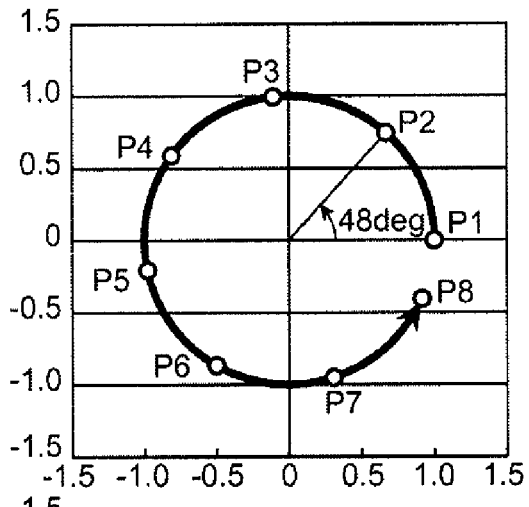
Fig. 15A  Circular motion first time
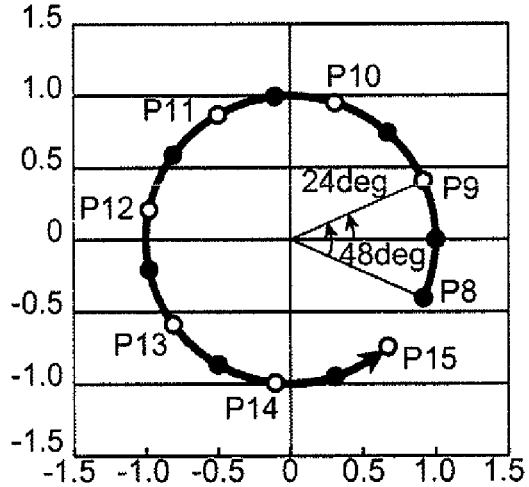
Fig. 15B  Circular motion second time
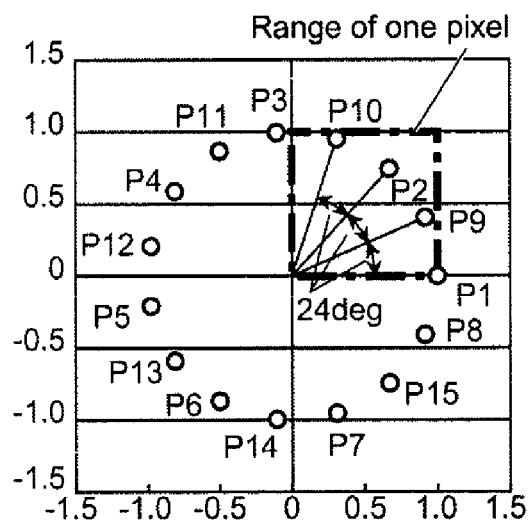
Fig. 15C  Total circular motion ○ Image capturing reference position newly determined
● Image capturing reference position determined before
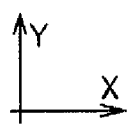
Fig.16A Circular motion first time
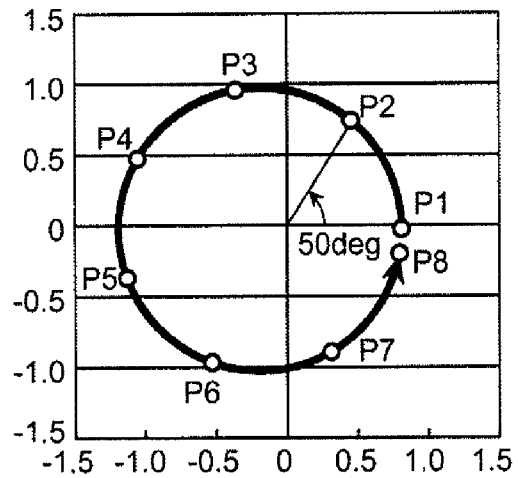
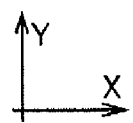
Fig.16B Circular motion second time
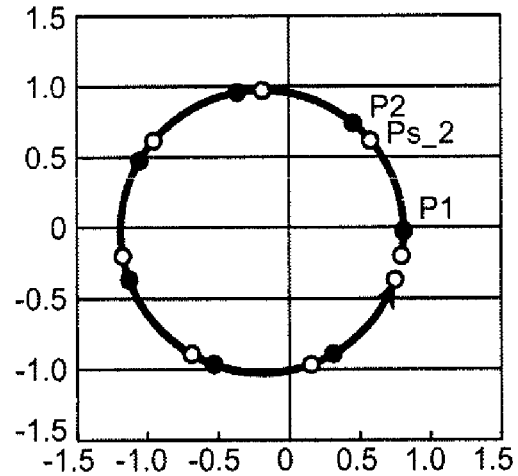
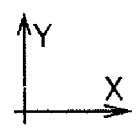
Fig.16C Circular motion third time
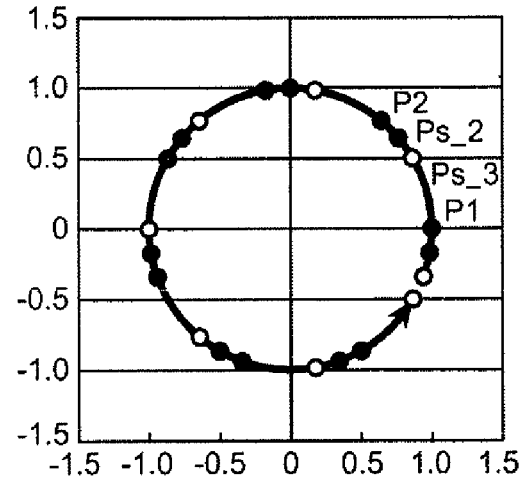

○ Image capturing reference position newly determined
● Image capturing reference position determined before
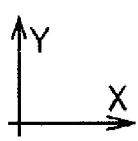
Fig.17A   Circular motion fourth time
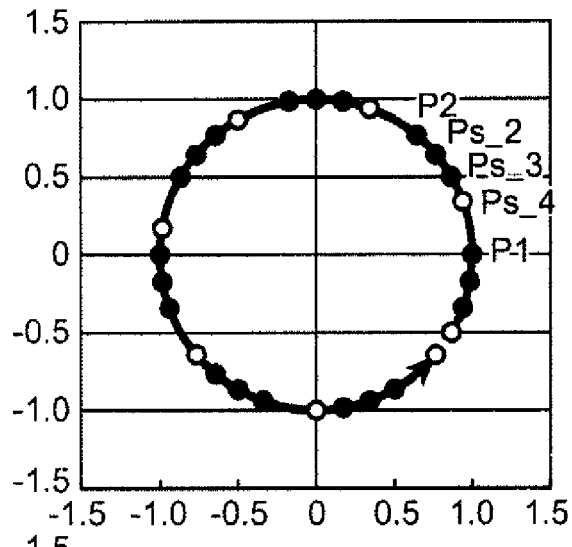
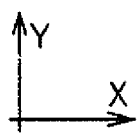
Fig.17B   Circular motion fifth time
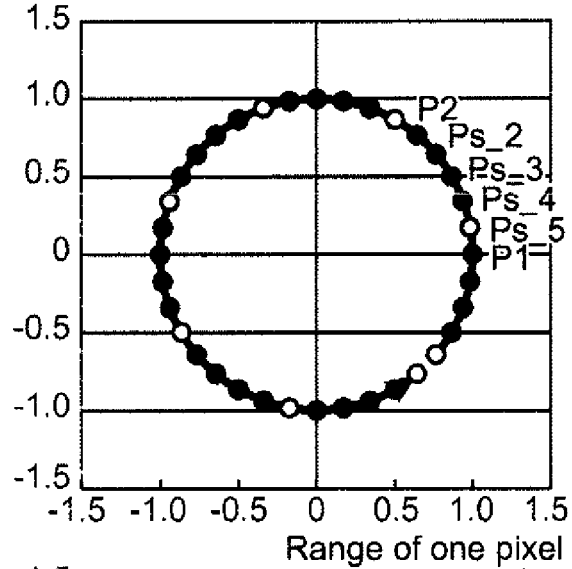
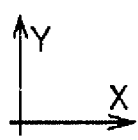
Fig.17C   Total circular motion
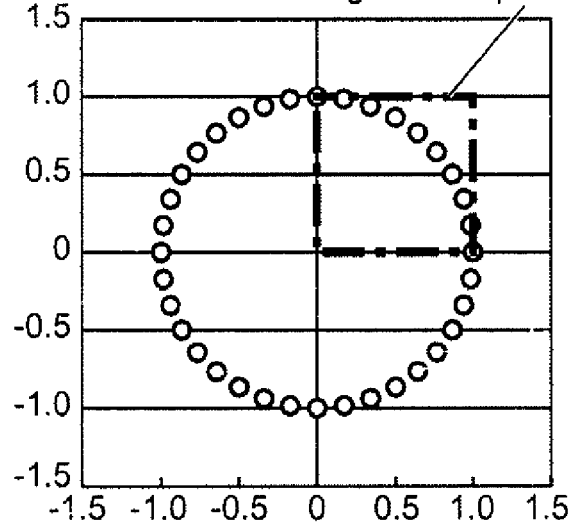

IMAGE CAPTURING DEVICE AND NETWORK CAMERA SYSTEM

CROSS-REFERENCE TO RELATED APPLICATIONS

The present application claims priority under 35 U.S.C. §119 of Japanese Applications No. 2009-253641, filed on Nov. 5, 2009, and No. 2010-109867, filed on May 12, 2010, the disclosures of which are expressly incorporated by reference herein in their entireties.

BACKGROUND OF THE INVENTION

1. Field of the Invention

The present invention relates to an image capturing device and a network camera system that obtain a plurality of images by performing image capturing while slightly displacing optical images formed on a light-receiving surface of an image capturing element relative to the image capturing element.

2. Description of Related Art

An image capturing device employs an image capturing element in which pixels are arranged in a two-dimensional matrix pattern. The resolution of the image capturing element is limited because it depends on the size of pixels and the number of pixels in the image capturing element. To generate images having a higher resolution than that of the image capturing element itself, super-resolution processing is performed after so-called pixel offset (optical shift) in which a plurality of original images are captured while optical images formed on a light-receiving surface of the image capturing element are slightly displaced relative to the image capturing element.

Such a technology of pixel offset requires an optical shift mechanism for slightly displacing the optical images and the image capturing elements with respect to each other (see Related Art 1).

For example, a parallel plate is provided between the image capturing element and a lens unit that forms images on the image capturing element based on light from an object. The parallel plate is inclined with respect to the optical axis of the lens unit, and the position of the optical image on a light-receiving surface of the image capturing element is displaced by rotating the parallel plate around the optical axis (see Related Art 2 and Related Art 3).

Related Art 1: Japanese Patent Application Publication No. 2008-306492

Related Art 2: Japanese Patent Application Publication No. 2000-125170

Related Art 3: Japanese Patent Application Publication No. 2000-278614

In the conventional art, however, when the angle of the parallel plate with respect to the optical axis is varied by swing or the like due to backlash or the like in a supporting mechanism for supporting the parallel plate to be driven in rotation, an optical shift amount (shift position) is significantly affected and a precision of the optical shift mechanism is deteriorated. When the optical shift amount is not precise, the calculation cost in the super-resolution processing is enormous.

SUMMARY OF THE INVENTION

In view of the above circumstances, the present invention provides an image capturing device and a network camera system which achieve precise optical shift even when the angle of the parallel plate varies with respect to the optical axis of the lens unit.

An aspect of the present invention provides an image capturing device that includes an image capturing element that performs photoelectric conversion of light from an object and outputs a pixel signal, a lens unit that forms images on the image capturing element based on light from the object, and an optical shift mechanism that displaces optical images formed on a light-receiving surface of the image capturing element relative to the image capturing element. The optical shift mechanism has an optical member provided with a parallel plate that is inclined at a predetermined angle with respect to the optical axis of the lens unit and rotated around the optical axis. The optical member is provided in a fluid having a higher refractive index than a refractive index of air.

According to an aspect of the present invention, with a structure where the parallel plate is provided in a fluid having a higher refractive index than that of the air, the difference in the refractive index between the parallel plate and the fluid is smaller than the difference between the parallel plate and the air, which makes the optical shift amount smaller than a case when the parallel plate is positioned in the air. Thus, the optical shift amount is less affected by the angle variation of the parallel plate with respect to the optical axis of the lens unit, and therefore, it is possible to achieve precise optical shift even when the angle of the parallel plate varies with respect to the optical axis of the lens unit.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 15A, 15B and 15C are schematic diagrams illustrating statuses of an image capturing reference position in one example of the ratio of the image capturing period to the circular motion period;

FIGS. 16A, 16B and 16C are schematic diagrams illustrating statuses of an image capturing reference position in another example of the ratio of the image capturing period to the circular motion period;

FIGS. 17A, 17B and 17C are schematic diagrams illustrating statuses of the image capturing reference position subsequent to FIGS. 16A, 16B and 16C;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Embodiments of the present invention will now be described with reference to the accompanying drawings. In the following description, the "axial" direction refers to the direction of the optical axis (corresponding to the top-bottom direction in FIG. 4), and the "radial" direction refers to the direction perpendicular to the optical axis (corresponding to the right-left direction in FIG. 4). The radial direction can be any angle within 360 degrees around the optical axis.

First Embodiment

Figure 1:
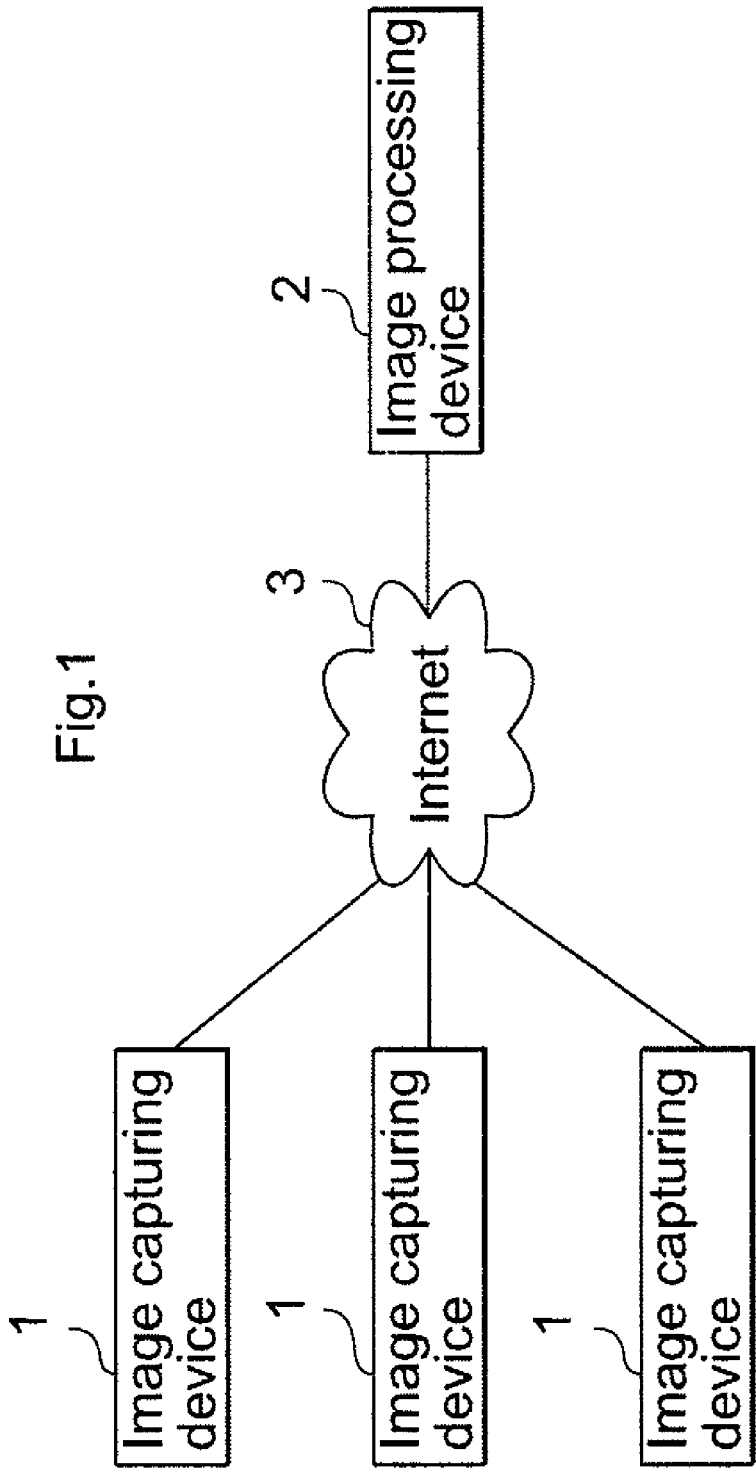
FIG. 1 is a diagram illustrating a whole structure of a network camera system according to a first embodiment of the present invention.

FIG. 1 is a diagram illustrating a whole structure of a network camera system according to a first embodiment of the present invention. As shown in FIG. 1, the network camera system to which the present invention is applied includes at least one image capturing device (as a non-limiting example, shown as a network camera) 1, and an image processing device 2. The image capturing device 1 and the image processing device 2 are connected, such as through the Internet 3, and the captured data generated by the image capturing device 1 is transmitted to the image processing device 2 located, for example, in a distant place so as to display the screen image on the image processing device 2. Various kinds of command signals for controlling the image capturing device 1 are transmitted from the image processing device 2 to the image capturing device 1.

Incidentally, the captured image data is transmitted from the image capturing device to the image processing device by the use of the Internet Protocol such as TCP (UDP)/IP. However, it can be transmitted by use of VPN (Virtual Private Network), for example, after encryption or encapsulation. It is also possible to use a network camera system called as CCTV (Closed Circuit TV) in which the image capturing device 1 and the image processing device 2 are connected one-on-one by a private line.

Figure 2:
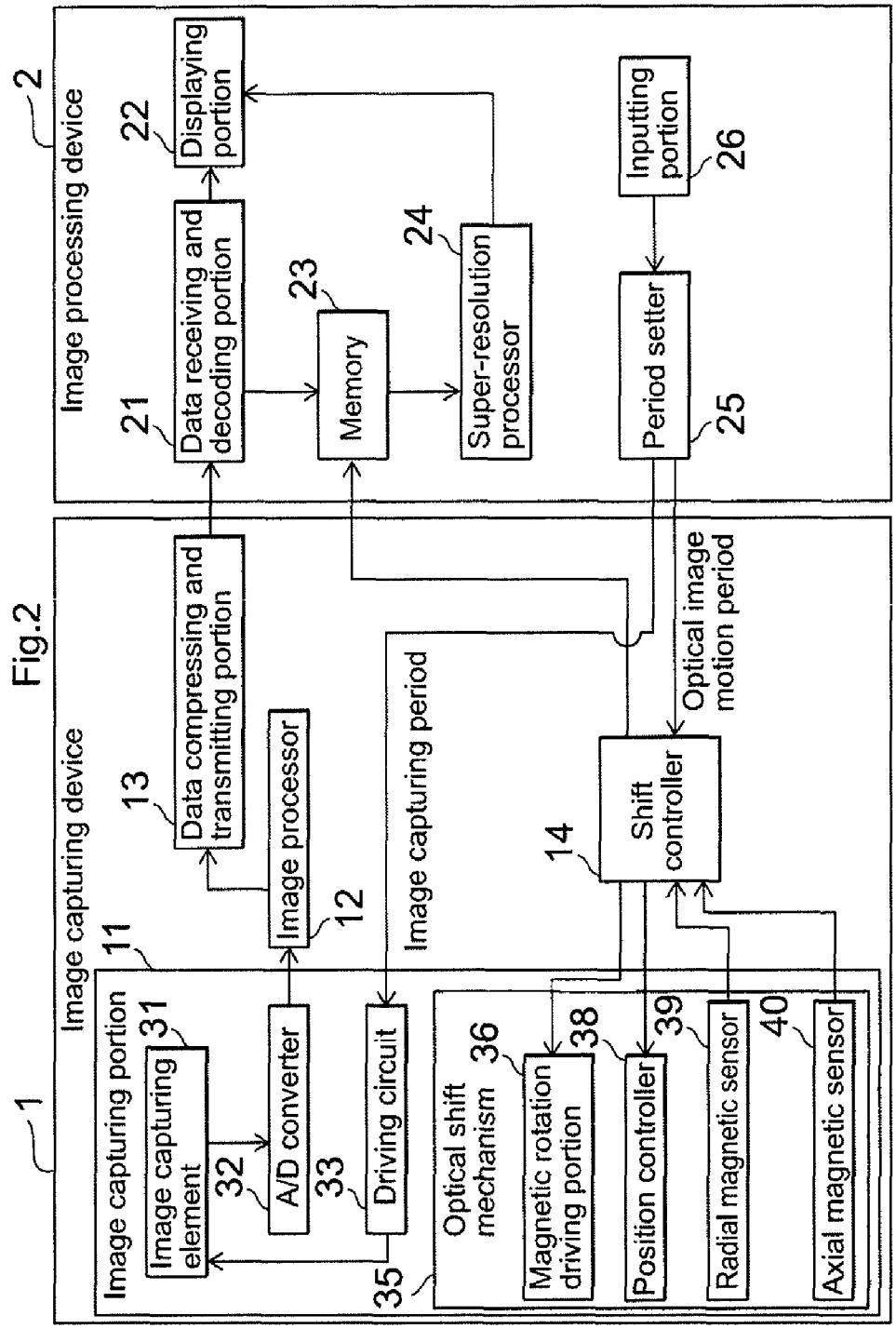
FIG. 2 is a block diagram illustrating a schematic configuration of the image capturing device and the image processing device shown in FIG. 1.

FIG. 2 is a block diagram illustrating a schematic configuration of the image capturing device and the image processing device shown in FIG. 1. As shown in FIG. 2, the image capturing device 1 has an image capturing portion 11, an image processor 12, a data compressing and transmitting portion 13, and a shift controller 14. The image capturing portion 11 has an image capturing element 31 that performs photoelectric conversion of light from an object and outputs an analog pixel signal. The image capturing element 31 is a two-dimensional CMOS image sensor. Alternatively, a two-dimensional CCD image sensor can be used for the image capturing element 31.

The analog signal output from the image capturing element 31 is converted into a digital signal in an A/D convertor 32. The digital signal is input into the image processor 12 where processing such as color correction, demosaicing processing, tone correction (γ correction), YC separation processing and the like is performed, and converted into an image data. Compression processing such as by H.264 or MPEG4 is performed on the image data, and thereafter the data is transmitted to the image processing device 2.

The image capturing portion 11, as described in detail later, has an optical shift mechanism 35 that slightly displaces optical images formed on a light-receiving surface of the image capturing element 31 relative to the image capturing element 31. The optical shift mechanism 35 includes a magnetic rotation driving portion 36 that magnetically drives rotation of an optical member (see numerical reference 51 of FIG. 4) for slightly displacing the optical image; a position controller 38 that controls the radial and axial positions of the optical member respectively; a radial magnetic sensor 39; and an axial magnetic sensor 40. The radial magnetic sensor 39 and the axial magnetic sensor 40 detect the radial and axial positions of the optical member respectively.

The optical shift mechanism 35 is controlled by the shift controller 14. The rotation section of the optical shift mechanism 35 is provided with a magnetized portion which is not shown in this drawing. The two magnetic sensors 39 and 40 detect the position information of the magnetized portion so as to output the information to the shift controller 14. The shift controller 14 controls the magnetic rotation driving portion 36 based on the position information so as to rotate the optical member, and also controls the position controller 38 so as keep the optical member at a predetermined position.

The image processing device 2 has a data receiving and decoding portion 21, a displaying portion 22, a memory 23, a super-resolution processor 24, a period setter 25, and an inputting portion 26. The image processing device 2 may be formed by installing a required application software in an information processing device such as a personal computer or a work station. Alternatively, the image processing device 2 may be an exclusive device such as a CCTV recorder.

In the image processing device 2, the compressed data transmitted from the image capturing device 1 is received and decoded by the data receiving and decoding portion 21, and thereafter converted into image data of RGB so as to be displayed in real time on the displaying portion 22 including a display and the like. Further, the image data of RGB is sent to the memory 23 including a hard disc drive device and the like, and temporarily stored to be read out from the memory 23 and played on the displaying portion 22 as needed.

In a case where a high-resolution image is needed, for example, to investigate a traffic accident or the like, the image data is read out from the memory 23, super-resolution processing is performed on the data in the super-resolution processor 24 so as to generate a high-resolution image (stationary image), and the high-resolution image is displayed on the displaying portion 22.

The inputting portion 26, as described in detail later, receives the input of the image capturing period from a user, and sends the image capturing period to the period setter 25. The period setter 25 determines a rotational motion period based on the image capturing period sent from the inputting portion 26, and transmits a command signal regarding the circular motion period to the image capturing device 1. The shift controller 14 of the image capturing device 1 drives rotation of the optical member at a rotation speed corresponding to the designated circular motion period by operating the optical shift mechanism 35 based on the command signal regarding the circular motion period.

Figure 3:
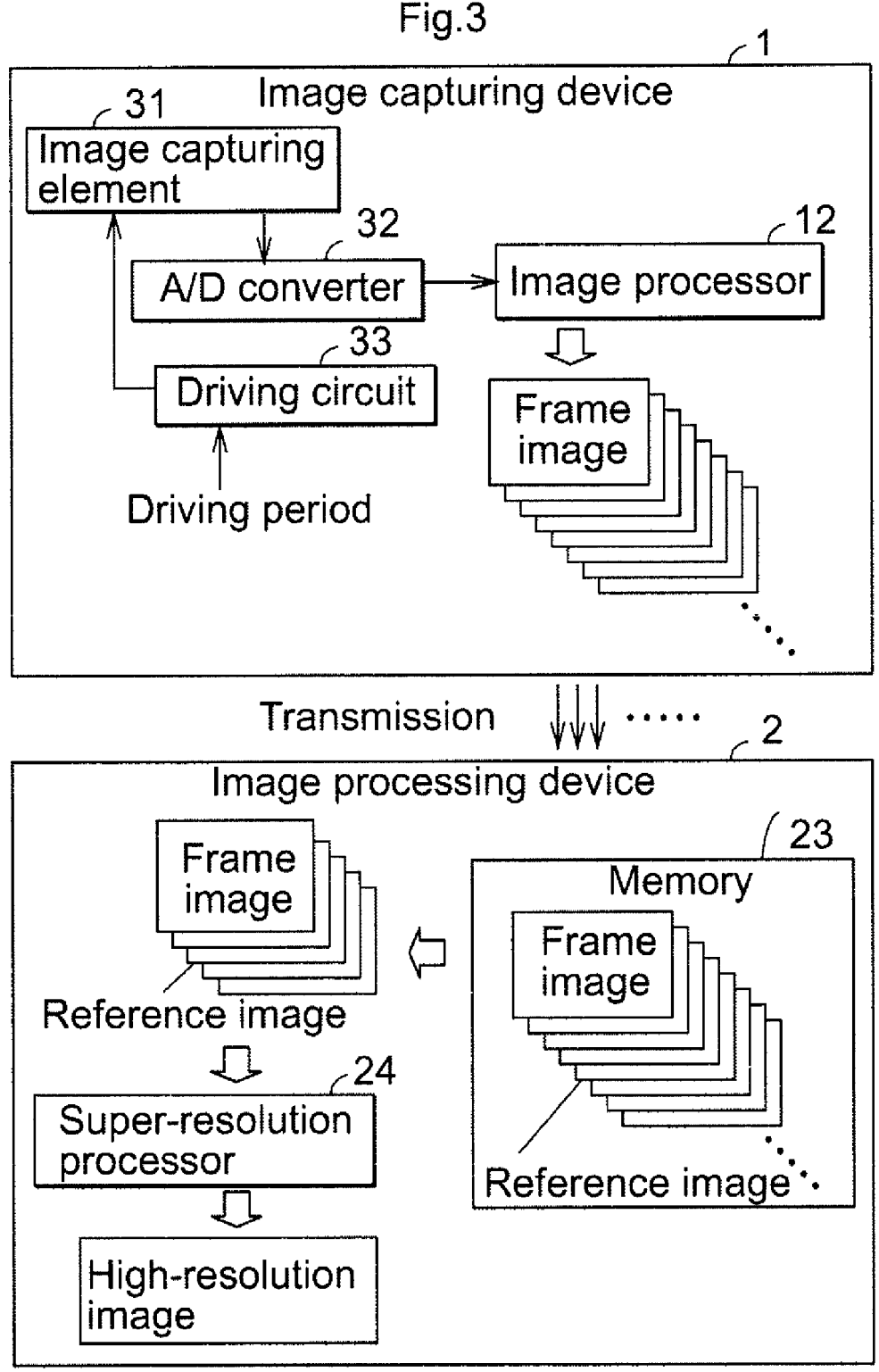
FIG. 3 is a schematic diagram illustrating processing statuses in the image capturing device and the image processing device shown in FIG. 1.

FIG. 3 is a schematic diagram illustrating processing status in the image capturing device 1 and the image processing device 2. As shown in FIG. 3, the image capturing element 31 is driven by a driving circuit 33, and image capturing (sampling) is performed at a predetermined period (hereinafter, image capturing period) corresponding to a timing signal created by the driving circuit 33. For example, when 30 sets of frame images are created per second, i.e., at a rate of 30 frame/sec, the image capturing period is set at around 30 ms.

In the super-resolution processor 24 of the image processing device 2, super-resolution processing is performed to generate high-resolution images from a plurality of frame images which are temporally consecutive. In the super-resolution processing, first, the frame images stored in the memory 23 are displayed as stationary images by frame-by-frame playback. Next, when a user designates a reference image from the images, the frame image as the reference image, the previous and next frame images of the reference image are read out from the memory 23 and sent to the super-resolution processor 24 so as to undergo super-resolution processing.

As the super-resolution processing, an ML (Maximum-likelihood) method, a MAP (Maximum A Posterior) method, or a POCS (Projection On to Convex Sets) method is used, and performed by operating application software in a CPU. In general, super-resolution processing requires a large amount of computing, and thus, a part of the processing may be performed by using a GPU (Graphic Processing Unit) or exclusive hardware.

Here, the ML method refers to a method that uses a square of an error between the pixel value of the low-resolution image estimated based on the high-resolution image and the actually observed pixel value as an evaluation function, and adopts a high-resolution image that minimizes the evaluation function as an estimated image. In sum, the ML method is a super-resolution processing method based on the principle of the most-probable estimation. The MAP method refers to a method that estimates a high-resolution image that minimizes an evaluation function in which probability information of the high-resolution image is added to a square of the error. In sum, the MAP method is a super-resolution processing method that estimates a high-resolution image as an optimization issue to maximize the posterior probabilities by using prospective information with respect to the high-resolution image. The POCS method is a super-resolution processing method that obtains a high-resolution image by forming simultaneous equations regarding the pixel values of the high-resolution image and the low-resolution image, and solving the equations sequentially.

These super-resolution methods include a process in which a high-resolution image is assumed, the pixel value of a low-resolution image is estimated from the assumed high-resolution image based on a point spread function (PSF function) obtained from a camera model, and a high-resolution image that reduces the difference between the estimated value and the observed pixel value (observed value) is searched. Therefore, these super-resolution methods are called reconstruction-based super-resolution processing.

Here, the process for searching the high-resolution image is to confirm where the pixel obtained as the low-resolution image is located in the high-resolution image, and it is called a "positioning" process. In general, in super-resolution processing, the positioning process is carried out repeatedly and broadly with respect to the vicinity of the focused pixel so as to achieve high resolution even in a case where variation in the pixel position among a plurality of low-resolution images is unclear. Consequently, it is known that the calculation cost becomes extremely high. In contrast, as described in detail later, according to the present invention, the position of the pixel shifted by the optical shift mechanism 35 is known, and each frame image, i.e., a low-resolution image is captured in the known position. With respect to at least a stationary object, therefore, it becomes possible to omit most of the positioning processes by the optical shift, which results in great reduction in the calculation cost.

Incidentally, super-resolution processing using image information over a plurality of temporally consecutive frames is specifically called multi-frame reconstruction-based super-resolution processing. On the other hand, it is called one frame reconstruction-based super-resolution in a case where reconstruction-based super-resolution processing is performed in a single frame. The present embodiment employs multi-frame reconstruction-based super-resolution.

Incidentally, here, a stationary image that became a high-resolution image by the super-resolution processing is played by the image processing device 2. When the processing capacity of the image processing device 2 is sufficiently high, however, it is also possible to play a moving image using the high-resolution image obtained by the super-resolution processing as a frame image.

Figure 4:
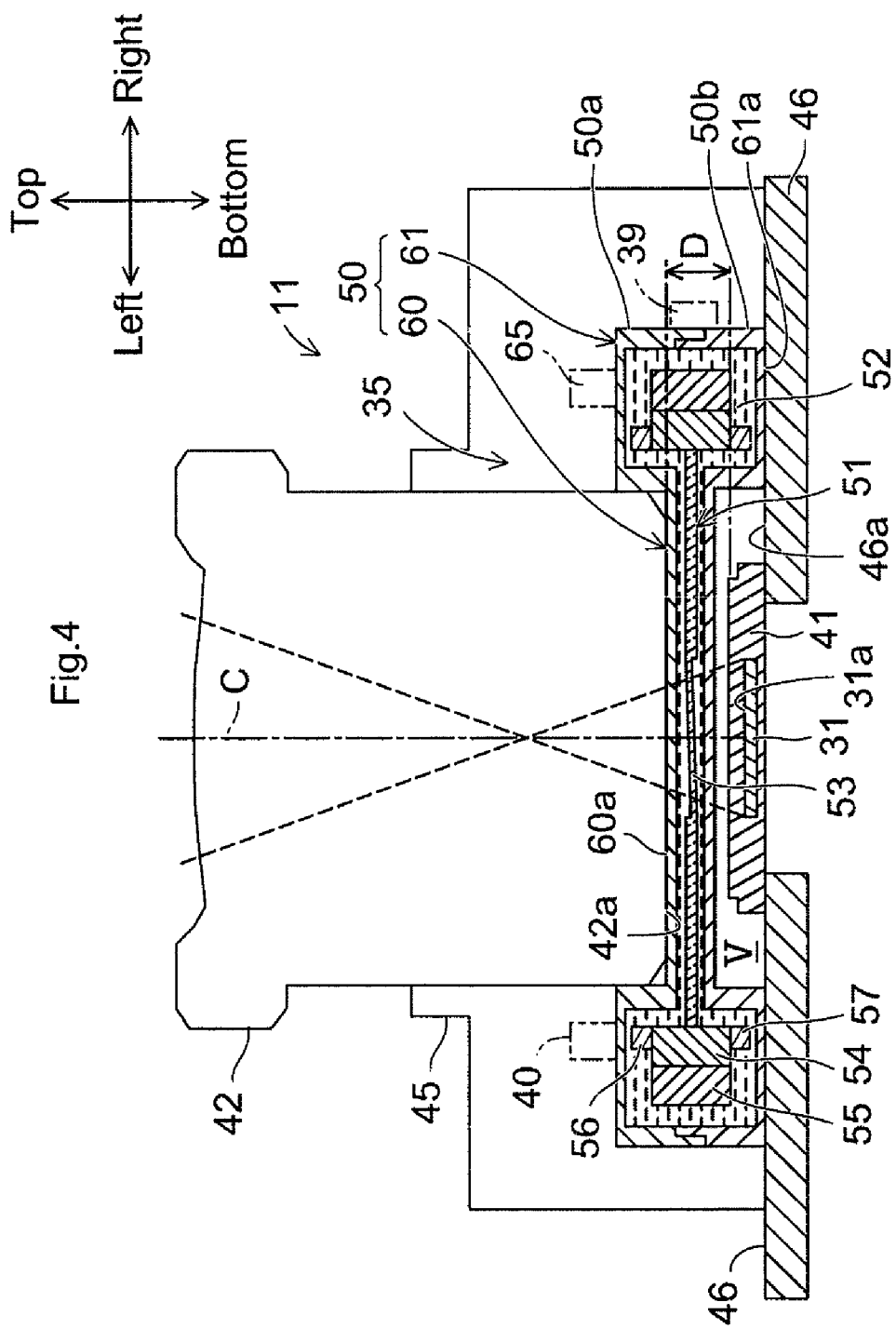
FIG. 4 is a cross-sectional view illustrating an image capturing portion of the image capturing device shown in FIG. 2.
Figure 5:
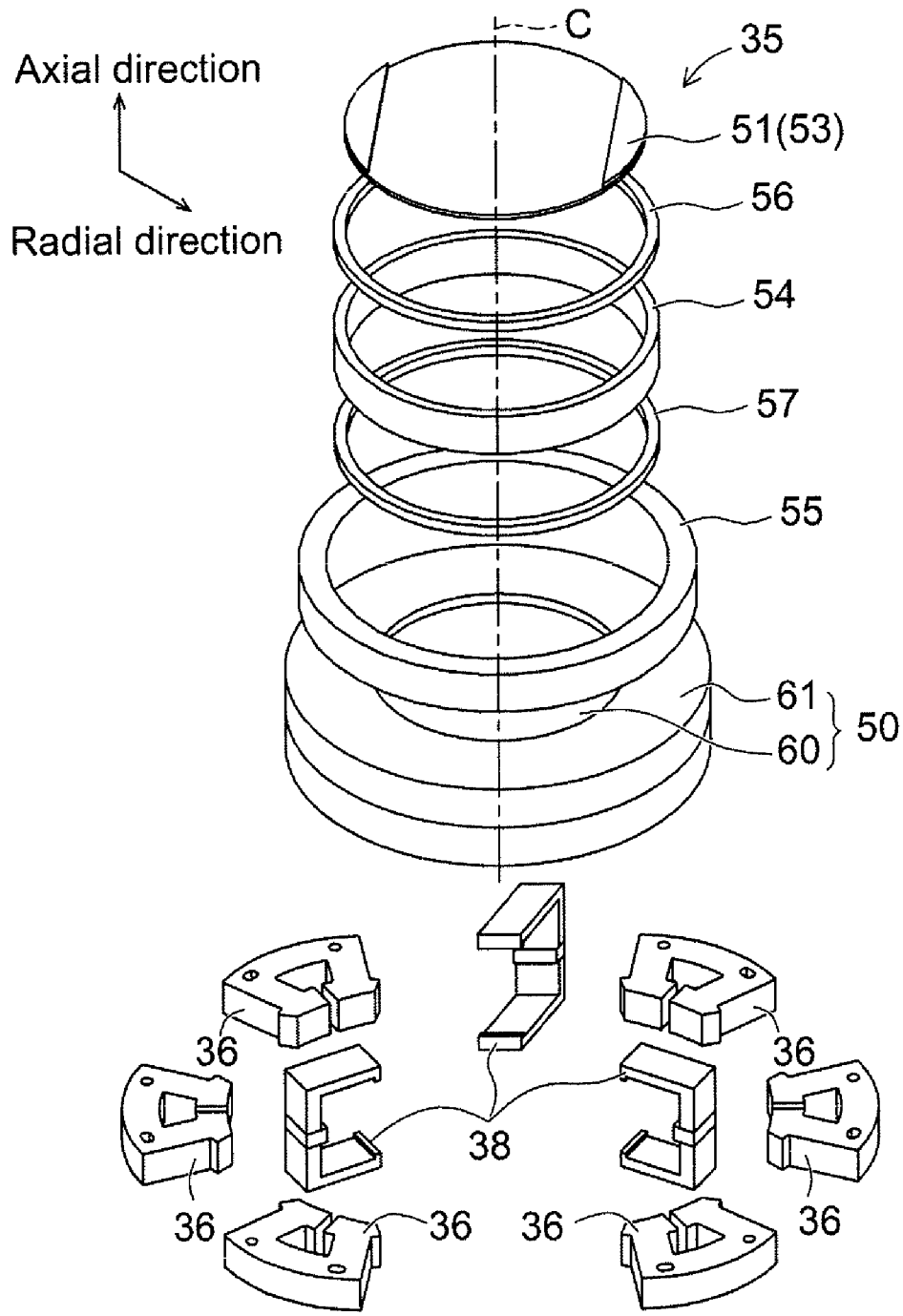
FIG. 5 is an exploded perspective view of the optical shift mechanism shown in FIG. 4.
Figure 6:
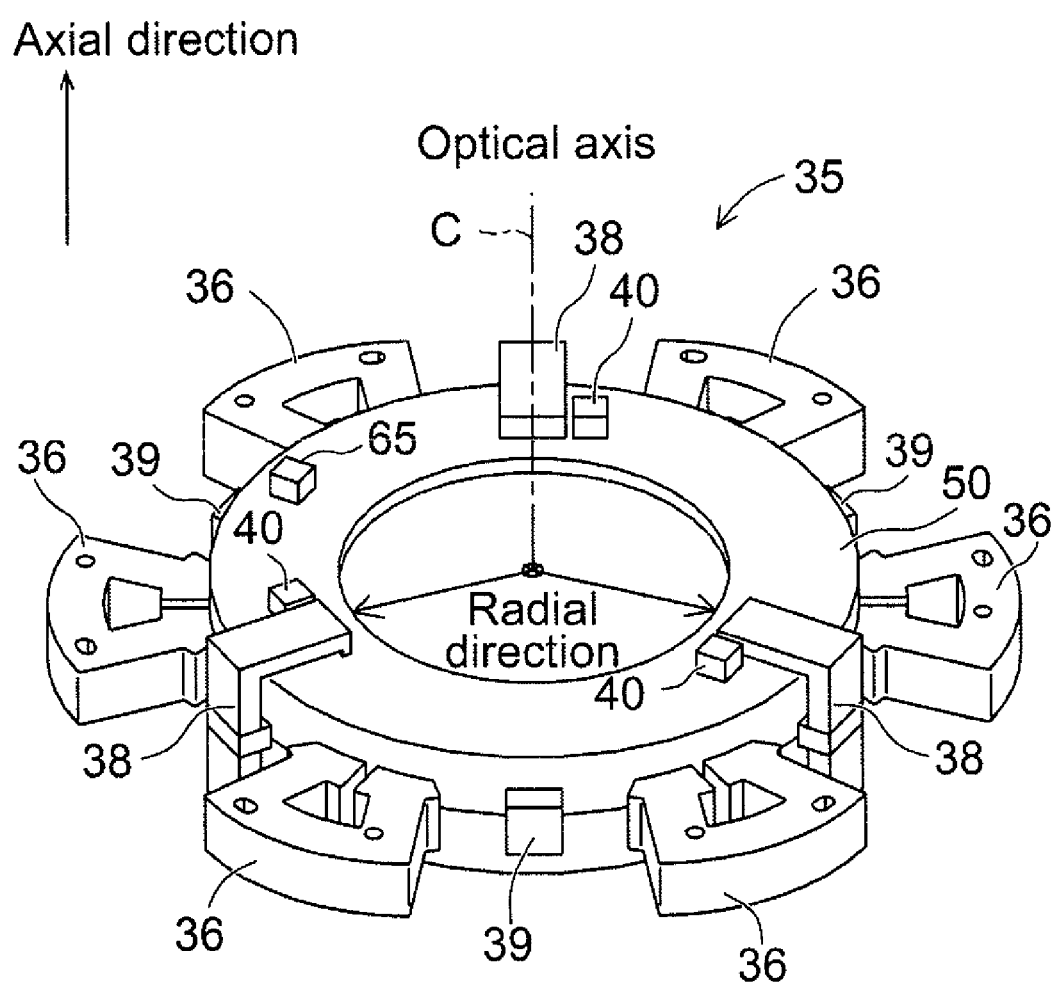
FIG. 6 is a perspective view of the optical shift mechanism shown in FIG. 4.
Figure 7:
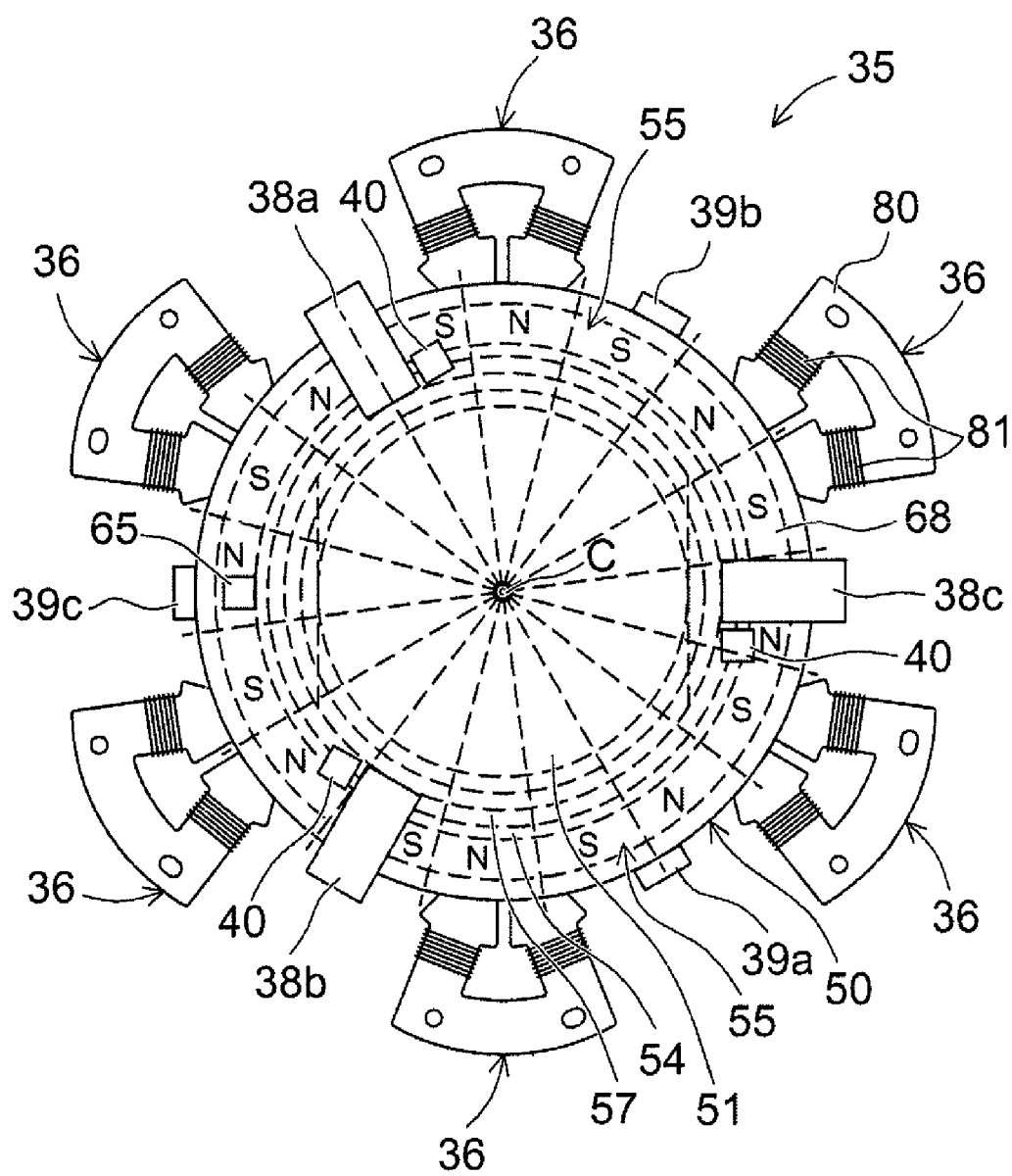
FIG. 7 is a plane view of the optical shift mechanism shown in FIG. 4.
Figure 8:
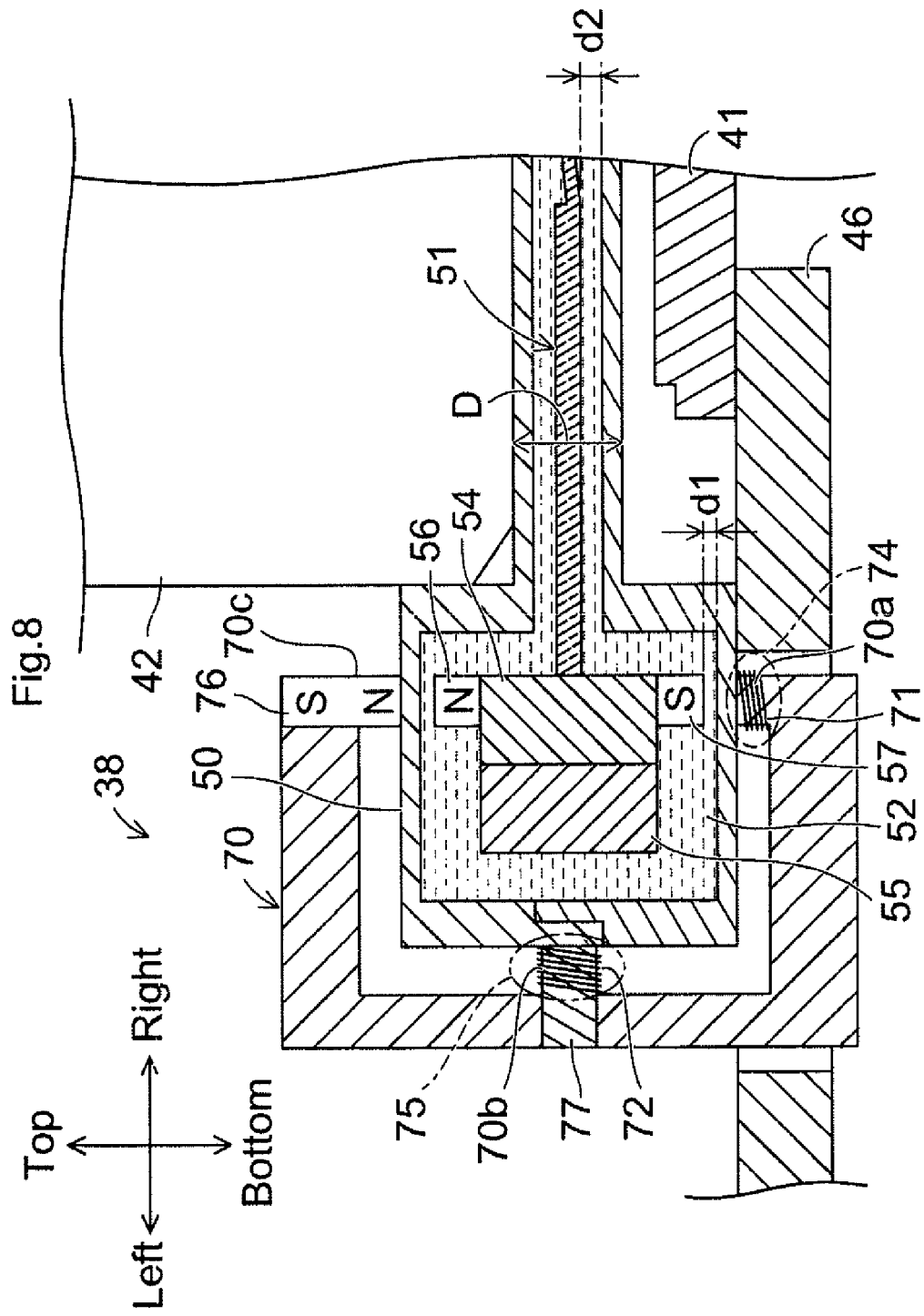
FIG. 8 is a cross-sectional view illustrating a main portion of the optical shift mechanism shown in FIG. 4.

FIG. 4 is a cross-sectional view illustrating the image capturing portion 11 of the image capturing device 1 shown in FIG. 2. FIG. 5 is an exploded perspective view of the optical shift mechanism 35 of the image capturing device 1 shown in FIG. 4. FIG. 6 is a perspective view of the optical shift mechanism 35. FIG. 7 is a plane view of the optical shift mechanism 35. FIG. 8 is a cross-sectional view illustrating a main portion of the optical shift mechanism 35. Incidentally, for convenience in the explanation, FIG. 5 shows a state where each member (the optical member 51 etc.) to be accommodated in an optical capsule (capsule member) 50 is taken out to the outside. Also, a rotation driving coil 81 shown in FIG. 7 is omitted in FIG. 5 and FIG. 6.

As shown in FIG. 4, the image capturing portion 11 of the image capturing device 1 has a sensor module 41 in which the image capturing element 31 is provided; a lens unit 42 that forms images based on light from an object (not shown in the drawing) onto a light-receiving surface 31a of the image capturing element 31; and the optical shift mechanism 35 that displaces optical images formed on the light-receiving surface 31a of the image capturing element 31 with respect to the direction perpendicular to the optical axis C. The lens unit 42 is supported on a base 46 through a lens holder 45. The sensor module 41 and the optical shift mechanism 35 are also supported on the base 46. Other electrical parts can be installed on the base 46 as needed.

The optical shift mechanism 35 has, as its main component, the optical capsule 50 made of, for example, transparent resin or a glass material, and the optical member 51 accommodated in the optical capsule 50. A liquid (fluid) 52 having a higher refractive index than that of the air is filled in the optical capsule 50. Also, the refractive index of the liquid 52 is set to be smaller than that of a parallel plate 53 which is described later.

The optical member 51 has a substantially circular shape, and is provided in the center thereof with the parallel plate 53 that is inclined at a predetermined angle with respect to the optical axis C of the lens unit 42. The outer periphery of the optical member 51 is provided with an annular back yoke 54 that supports the outer periphery; an annular radial magnet 55 attached to the outer periphery of the back yoke 54; an upper magnet (first axial magnet) 56 and a lower magnet (second axial magnet) 57 fixed to the portion of the back yoke 54 where light of the optical member 51 enters and emits (here, the upper and bottom surfaces of the back yoke 54), respectively. Both of the upper magnet 56 and the lower magnet 57 have an annular shape of the same diameter. These members 54-57 are positioned coaxially around the optical axis C, and accommodated in the optical capsule 50 filled with the liquid 52 together with the optical member 51.

The optical capsule 50 is configured by two members 50a and 50b vertically superposed with each other, which forms a sealed space to be filled with the liquid 52. The optical capsule 50 has a cross section that is narrow in the center. The optical capsule 50 has a central portion 60 that defines a circular space around the optical axis C; and an annular portion 61 that continues to the outer periphery of the central portion 60 and defines an annular space having a rectangular cross section. While the parallel plate 53 is accommodated in the central portion 60, the outer peripheral portion of the optical member 51 and the back yoke 54 and the like are accommodated in the annular portion 61 arranged vertically. Here, the distance between the inner surface of the optical capsule 50 and the surface of the optical member 51 are set to be 0.5 mm. With respect to the optical capsule 50, at least the light path area (area where the incident light from the lens unit 42 passes) around the optical axis C in the central portion 60 needs to be formed by a transparent material as described above.

Typically, the distance D between the lens unit 42 and the sensor module 41 where the optical capsule 50 (central portion 60) is provided is very small (for example, around 3 mm). The distance becomes smaller as the capturing area becomes broader. By providing only the optical member 51 (parallel plate 53) in the light path, however, the structure of the device has no problem irrespective of such a small distance D.

An upper surface 60a of the central portion 60 of the optical capsule 50 abuts a lower surface 42a of the lens unit 42. With this, the light path (strictly, the space where the incident light passes) between the optical capsule 50 and the lens unit 42 is sealed. Further, a lower surface 61a of the annular portion 61 abuts an upper surface 46a of the base 46. With this, the light path (i.e., a space V defined by the optical capsule 50, the sensor module 41, and the base 46) between the optical capsule 50 and the sensor module 41 is sealed. With these structures, it is possible to prevent deterioration of the image quality caused by entry of dust or the like into the light path from the lens unit 42 to the image capturing element 31. As a method for sealing the light path, it is possible to use a structure where the optical capsule 50 directly abuts an image sensor when the image capturing element 31 is considered as a molded image sensor itself.

The area other than the light path of the optical capsule 50 may be non-transparent (for example, black). With this, it is possible to prevent stray light, i.e., unwanted light from entering the image capturing element 31.

As described in detail later, an anti-freeze solution (a mixture of propylene glycol and water) is used as the liquid 52 in this embodiment. When the liquid 52 includes water, there is a likelihood that rust will occur in the back yoke 54 that is made of a magnetic material (for example, iron-based material). In order to prevent this, a resin coating is applied to a surface of the back yoke 54. Although the magnetic properties slightly deteriorates, it is also possible to prevent rust from occurring by making the back yoke 54 of a non-magnetic metal material such as SUS316 or the like, resin, or the like.

As shown in FIG. 5, the vicinity of the optical capsule 50 of the optical shift mechanism 35 is provided with six magnetic rotation driving portions 36 that rotate the optical member 51 and the radial magnet 55 in a non-contact state with anything other than the fluid, i.e., in a non-contact state with the inner wall of the optical capsule 50 by applying magnetic forces on the radial magnet 55. The vicinity of the optical capsule 50 of the optical shift mechanism 35 is also provided with three position controllers 38 (hereinafter, when it is necessary to distinguish each of them, they are referred to as position controllers 38a, 38b, and 38c as shown in FIG. 7) that retain the radial and axial positions of the optical member 51 at a normal position (a regular position where the parallel plate 53 can rotate without contacting the optical capsule 50) by applying respective magnetic forces on the radial magnet 55, the upper magnet 56, and the lower magnet 57. The radial magnet 55, the upper magnet 56, and the lower magnet 57 of the optical member 51 are made of a permanent magnet, and an electromagnet is used as each of the position controllers 38 that apply magnetic forces on the radial magnet 55, the upper magnet 56, and the lower magnet 57. With these, no signal wires need to be introduced into the optical capsule 50 and thereby the sealing properties of the optical capsule 50 can be improved.

As described in detail later, rotation and radial position controls of the optical member 51 are performed based on information output from the three radial magnetic sensors 39 (hereinafter, when it is necessary to distinguish each of them, they are referred to as radial magnetic sensors 39a, 39b, and 39c as shown in FIG. 7) serving as a position detector shown in FIG. 6. Also, axial position control of the optical member 51 is performed based on information output from the axial magnetic sensors 40 serving as a position detector shown in FIG. 6.

With these structures, the optical member 51 is rotated within the optical capsule 50 filled with the liquid 52 in a non-contact state. In this structure using magnetic forces, that is similar to a bearingless motor, there is no sliding area, the optical shift mechanism 35 is driven at extremely low oscillation, and a long life-span can be achieved.

As shown in FIG. 6, the vicinity of the optical capsule 50 is provided with an origin sensor 65 that periodically detects the original position associated with rotation of the optical member 51. The origin sensor 65 is formed by a reflection photosensor (photo reflector), and detects a marking portion, not shown in the drawing, of a specific color (for example, white when the back yoke 54 is black) that is printed on the back yoke 54 (see FIG. 5) of the optical member 51. The origin sensor 65 is not limited to the reflection photosensor, and conventional sensors including other optical sensors can be used. By the output from the origin sensor 65, and the magnetic pole position of a magnetized portion 68 (see FIG. 7) of the radial magnet 55 detected by the output from the radial magnetic sensors 39, it is possible to reliably know the optical shift direction by the parallel plate 53 inclined with respect to the optical axis C.

In super-resolution processing performed in the super-resolution processor 24 shown in FIG. 2, it is known that the computing cost of the positioning process can be greatly reduced in a case where the image capturing position is determined in a submicron order of magnitude (for example, when an image capturing element of 1,200,000 pixels is structured in a ⅓-inch size, the pixel pitch is about 3.75 μm. When this is expanded by 4×4 times through super-resolution processing, the new pixel pitch becomes 3.75/4=0.93 μm, which requires displacement in submicron order.). In the image capturing device and the network camera system according to the present invention, since the above-described origin sensor 65 is used and the shift position of the optical image is determined when image capturing is performed in the image capturing element 31 based on a timing signal created by the driving circuit 33, it is possible to reduce the computing cost of super-resolution processing. In sum, according to the present invention, since the shift position of images can be reliably known, the above-described search amount in high-resolution images can be reduced, and the computing cost of the super-resolution processing can be greatly reduced with respect to the stationary portions of the image-captured objects of the optical shift.

As shown in FIG. 7, the radial magnet 55 has the magnetized portion 68 formed by sixteen magnetic poles that are magnetized as an N pole and an S pole alternately along the circumferential direction. The radial magnet 55 is a plastic magnet made of polyphenylene sulfide (PPS) resin in which minute magnetic particles are dispersed and mixed, and thereby water absorption and swelling can be prevented even in the liquid 52 that contains water. Here, neodymium is used as the magnetic particles. A neodymium magnet having an extremely large magnetic force can achieve large driving torque, and is effective when the viscosity of the liquid 52 is large at low temperature. However, since neodymium might be oxidized by water so as to generate rust, the radial magnet 55 is prevented from coming into contact with the liquid 52 by coating the surface of the radial magnet 55 with a resin material. In addition, the upper magnet 56 and the lower magnet 57 are also made of PPS in which minute neodymium magnetic particles are dispersed and mixed, and a resin coating is also applied thereto. The magnetic particles used for the radial magnet 55, the upper magnet 56, and the lower magnet 57 are not limited to neodymium, and it is possible to use, for example, ferrite, samarium cobalt, or the like.

The magnetic rotation driving portion 36 has a stator core 80 formed by a plurality of layers of electromagnetic steel tapes, and a rotation driving coil 81 formed by a lead wire coiled around the stator core 80. The stator core 80 has a substantially U-shape, and are provided at regular intervals along the outer periphery of the optical capsule 50 in a state where the both ends of the stator core 80 abut the outer wall of the optical capsule 50. The stator cores 80 are also provided to oppose the magnetized portion 68 of the radial magnet 55 through the optical capsule 50. With this, the optical shift mechanism 35 has a similar structure to an inner-rotor type 3-phase motor (in this embodiment, 12 slots and 16 poles). The magnetic rotation driving portion 36 rotates the magnetized portion 68 in a predetermined direction with attractive forces and repulsive forces acting on the magnetized portion 68 by a magnetic field generated by causing electric current to flow through the rotation driving coil 81. With this, the back yoke 54 and the optical member 51 (parallel plate 53) are rotated around the optical axis C.

The radial magnetic sensors 39a, 39b, and 39c can be formed by a Hall element, and are provided at regular intervals along the outer periphery of the optical capsule 50 in the circumferential direction in a state of abutting the outer wall of the optical capsule 50. Each of the radial magnetic sensors 39a, 39b, and 39c are positioned between two adjacent magnetic rotation driving portions 36. With this positioning of the radial magnetic sensors 39a, 39b, and 39c, it is possible to accurately detect the shift amount of the optical member 51 in the radial direction. Also, by using a Hall element as the radial magnetic sensor 39, it is possible to detect the position of the optical member 51 in the optical capsule 50 at an accuracy of about 1 μm. In a case where a higher accuracy is required, a position sensitive detector (PSD) may be used instead of the Hall element. Using a PSD can improve the position detecting accuracy to be around 0.1 μm. However, other sensors can also be used.

Incidentally, the accuracy of 1 μm in a case of using a Hall element as the position detector is not inconsistent with determination of the image capturing position in submicron order as described above. In the optical shift mechanism 35 of the present embodiment, the optical member 51 (parallel plate 53) only has the power to shift the incident light in parallel, and the shift position of the optical images is determined solely by the rotation angle of the optical member 51. Even if the optical member 51 is displaced in parallel with respect to the axial or radial direction, the shift position by the parallel plate 53 is not affected at all, and if there is a case where it might be affected, it is when the inclination angle of the optical member 51 is varied with respect to the optical axis C. In the present embodiment, as described in detail later, the effect of variation in the inclination angle is reduced, and consequently, the shift position can be determined at an accuracy of submicron order, while the detection accuracy is around 1 μm.

In the structure of 12 slots and 16 poles shown in FIG. 7, six spaces are formed between adjacent magnetic rotation driving portions 36 in the outer periphery of the optical capsule 50. In these spaces, therefore, the three radial magnetic sensors 39a, 39b, and 39c can be provided in a position of being rotated by 180 degrees with respect to the three position controllers 38a, 38b, and 38c, respectively, around the optical axis C. With this, the space outside the optical capsule 50 can be effectively utilized, which makes it possible to reduce the size of the device, and also makes it possible to facilitate the radial position control of the optical member 51.

The radial magnetic sensor 39 detects a magnetic force generated from the magnetized portion 68 of the radial magnet 55 and thereby outputs the position information of the magnetic pole (N pole and S pole) of the magnetized portion 68. More specifically, when a pair of the N pole and the S pole of the radial magnet 55 is shifted relative to the radial magnetic sensor 39, the radial magnetic sensor 39 outputs a sine wave where the shift is considered as one cycle to the shift controller 14 (see FIG. 2) as the position information. The shift controller 14 calculates the rotation speed of the optical member 51 by processing this position information. The radial magnetic sensor 39 and the shift controller 14 serve as a rotation position detector and a rotation speed detector for the optical member 51.

Instead of this rotation speed detection method, for example, a marking can be applied to the outer periphery (such as the magnetized portion) of the optical member 51 or the radial magnet 55, and the marking can be detected by an optical sensor (photo reflector). In this case, since white and black marking can be applied at a relatively small pitch, the rotation angular speed can be detected at a higher sampling rate. Furthermore, other detectors can also be used.

The axial magnetic sensor 40 is provided in the vicinity of the position controller 38 to abut the upper surface and the outer wall of the optical capsule 50. As shown by the two-dot chain line in FIG. 4, the axial magnetic sensor 40 is provided so as to oppose the upper magnet 56 through the optical capsule 50. In some cases, however, the axial magnetic sensor 40 may be provided so as to oppose the lower magnet 57. The axial magnetic sensor 40 detects the magnitude of the magnetic force generated from the upper magnet 56, and thereby outputs the axial position information of the back yoke 54 (i.e., optical member 51) where the upper magnet is attached. Based on this position information, the shift controller 14 (see FIG. 2) controls electric current that flows through an axial position controlling coil 71 (see FIG. 8), and controls the axial position of the optical member 51.

As shown in FIG. 8, the position controller 38 has a stator core 70 having a substantially E-shape formed by a plurality of layers of electromagnetic steel laminates; an axial position controlling coil 71 coiled around a projection 70*a* projecting in the upward direction (direction parallel to the optical axis) in the lower end of the stator core 70; and a radial position controlling coil 72 coiled around a projection 70*b* projecting in the lateral direction (direction perpendicular to the optical axis) in the intermediate portion of the stator core 70. The tip ends of the projection 70*a* and the projection 70*b* abut the lower surface and the outer peripheral surface of the optical capsule 50, respectively.

An electromagnet 74 formed in the projection 70*a* by the axial position controlling coil 71 serves as an axial magnetic force generator that generates magnetic forces acting on the lower magnet 57. Thus, the electromagnet 74 is used for controlling the axial position of the optical member 51. Also, another electromagnet 75 formed in the projection 70*b* by the radial position controlling coil 72 serves as a radial magnetic force generator that generates magnetic forces acting on the radial magnet 55. Thus, the electromagnet 75 is used for controlling the radial position of the optical member 51.

The upper end of the stator core 70 is provided with a projection 70*c* that projects in the downward direction (direction parallel to the optical axis) and opposes the projection 70*a* in a state where the optical capsule 50 is positioned therebetween. The projection 70*c* is formed as part of a permanent magnet 76, and the tip end of the projection 70*c* abuts the upper surface of the optical capsule 50. The permanent magnet 76 serves as an axial magnetic force generator that generates magnetic forces acting on the upper magnet 56. The permanent magnet 76 cooperates with the opposing lower electromagnet 74, and is used for controlling the axial position of the optical member 51. In this instance, since the permanent magnet 76 and the upper magnet 56 is the same magnetic pole (here, both are an N pole), a repulsive force acts therebetween. Here, a neodymium magnet is used as the permanent magnet 76, however, another magnet (such as a ferrite magnet) can be used in terms of the balance with the magnetic force of the lower electromagnet 74.

The projection 70*b* is formed as part of a connecting member 77 that connects the upper portion and the lower portion of the stator core 70. The connecting member 77 is made of a non-magnetic material (such as resin or ceramic) so as not to generate magnetic interaction among the electromagnet 74, the electromagnet 75, and the permanent magnet 76.

In the present embodiment, the position controller 38 controls the radial and axial positions of the optical member 51. However, another structure is also possible by separately providing a position controller that controls the radial position and another position controller that controls the axial position.

In the axial position control, the electromagnet 74 is excited by causing electric current to flow through the axial position controlling coil 71, which generates a repulsive force between the electromagnet 74 and the lower magnet 57 having the same magnetic pole (here, S pole). The axial position of the optical member 51 is maintained in a regular position by balancing the magnitude of this repulsive force with a repulsive force acting between the permanent magnet 76 and the upper magnet 56 which are located on the opposite side of the electromagnet 74 with respect to the optical capsule 50.

In a case where the electromagnet 74 is not excited, a repulsive force from the permanent magnet 76 acts on the optical member 51, causing the optical member 51 to move downward. Further, the optical member 51 is fixed by the attractive force between the lower magnet 57 and the non-power-state stator core (i.e., a state where the lower end of the lower magnet 57 abuts the optical capsule 50). In this manner, when the power of the image capturing device is off (for example, when the image capturing device is delivered), the optical member 51 is securely fixed, which makes it possible to prevent the parallel plate 53 from being damaged. In this instance, in terms of damage prevention or the like, the optical member 51 (parallel plate 53) is preferably not in contact with the optical capsule 50 in the above-described fixed state. Thus, when the optical member 51 is in the regular position shown in FIG. 8, the distance d1 between the lower magnet 57 and the optical capsule 50 is set to be smaller than the distance d2 between the optical member 51 and the optical capsule 50.

Incidentally, another structure of the optical shift mechanism 35 is possible by causing an attractive force to act between the permanent magnet 76 and the upper magnet 56, and between the electromagnet 74 and the lower magnet 57, respectively, and balancing these attractive forces. With the repulsive force as described above, however, there is an advantage of preventing such a trouble that the device will not boot up due to a frictional force generated in the optical member 51 by the effect of the magnetic force (attractive force) of the upper magnet 56 or the lower magnet 57 at the time of the initial boot up.

Also, in the radial position control, the electromagnet 75 is excited by causing electric current to flow through the radial position controlling coil 72, which generates a repulsive force with respect to the radial magnet 55. The repulsive force acts from three directions around the radial magnet 55 according to the locations of the position controllers 38*a*, 38*b*, and 38*c* shown in FIG. 7, and the radial position of the optical member 51 is maintained in a regular position by balancing the repulsive forces from the three directions.

In the optical shift mechanism 35, as shown in FIG. 7, the position controller 38*a* and the radial magnetic sensor 39*a*, the position controller 38*b* and the radial magnetic sensor 39*b*, and the position controller 38*c* and the radial magnetic sensor 39*c* are provided in positions opposite with respect to one another, respectively, around the optical axis C. Further, the radial position controlling coil 72 (see FIG. 8) of the position controllers 38*a*, 38*b*, and 38*c* is driven based on the position information detected by the radial magnetic sensors 39*a*, 39*b*, and 39*c*, respectively. With these structures, increase in the output from the radial magnetic sensor 39 is directly linked with increase in the space distance between the corresponding position controller 38 and the optical member 51 (radial magnet 55), which facilitates the position control processing.

Also, in the optical shift mechanism 35, as shown in FIG. 6 and FIG. 7, the magnetic rotation driving portion 36, the radial magnetic sensor 39, the axial magnetic sensor 40, and the position controller 38 abut the outer surface of the optical capsule 50, respectively. That is, the elements required for the rotation driving control and the position control of the optical member 51 are provided in a state of abutting the optical capsule 50. With this, when the size accuracy of the optical capsule 50 itself is properly controlled, it is possible to set the position relationship (distance relationship) among the elements at an extremely high accuracy, and achieve high controlling performance. Here, as a preferred embodiment, all the elements required for the rotation driving control and the position control abut the optical capsule 50. However, the present invention is not limited to this structure. Another structure where some, but not all, of the elements abut the optical capsule 50 is also possible.

In the above-described optical shift mechanism 35, a similar structure to a 3-phase motor is used for rotating the optical member 51. However, a structure similar to a single-phase motor can achieve a similar effect.

Figure 9:
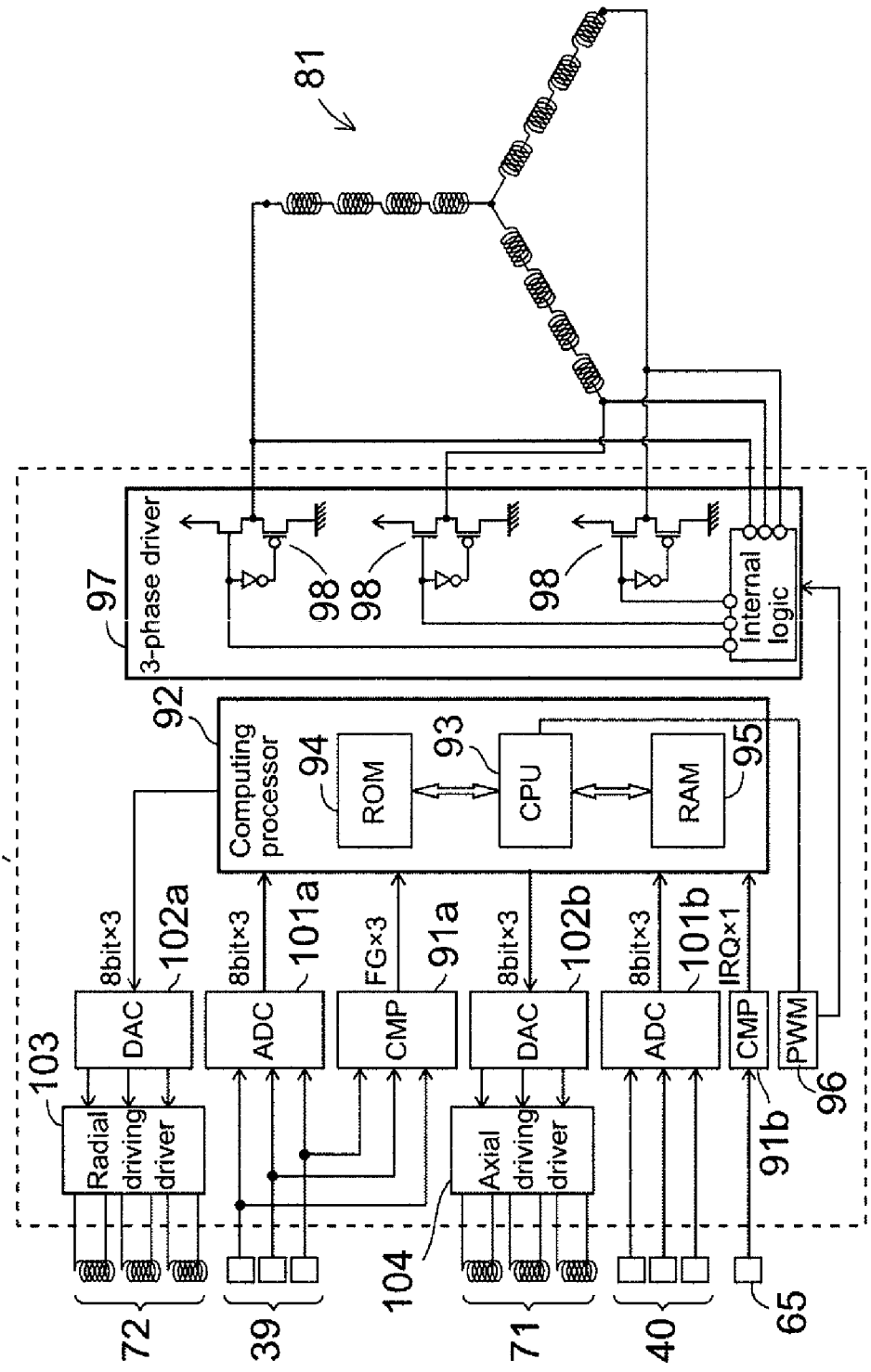
FIG. 9 illustrates a configuration of a shift controller in the optical shift mechanism shown in FIG. 4.

FIG. 9 is a structural diagram of the shift controller 14 and the optical shift mechanism 35 shown in FIG. 4. Hereinafter, explanation will be made on the rotation driving control and the position control of the optical member 51 by the shift controller 14 with reference to FIG. 9 and FIG. 7.

First, explanation will be made on the rotation driving control of the optical member 51. As shown in FIG. 7, the magnetized portion 68 having sixteen poles is provided in the radial magnet 55 of the optical member 51, and magnetism generated from the magnetized portion 68 is detected by the three radial magnetic sensors 39. The detection output (analog signal) from the radial magnetic sensor 39 is binarized by a comparator (CMP) 91a, and output as 3-system FG pulses. With respect to each pulse, time between the pulses (for example, rise interval between adjacent pulses) is counted by a high-speed counter (not shown in the drawing) provided in the shift controller 14. The counted value is output to a computing processor 92. Also, the detection output of the origin sensor 65 is binarized by a comparator (CMP) 91b, and output to the computing processor 92 as an interrupt signal (IRQ).

Here, the distance between the magnetic poles is known because the intervals between the magnetic poles of the magnetized portion 68 are set to be identical. Thus, when this distance is divided by the time counted by the high-speed counter, a speed calculated value Vn can be obtained. In sum, according to the present embodiment, the computing processor 92 also serves as a speed calculator, and calculates the rotation speed of the optical member 51 based on the output from the radial magnetic sensor 39. With this structure, the radial magnetic sensor 39 can perform the speed detection and the position detection of the optical member 51, which results in cost reduction of the device.

Next, explanation will be made on the processing in the computing processor 92. The computing processor 92 has a CPU 93 that performs computing processing, a ROM 94 that stores a program required for the processing in the CPU 93, and an RAM 95 that serves as an work area when the CPU 93 performs a program. In the computing processor 92, PI control (proportional-plus-integral control) is performed based on the calculated rotation speed of the optical member 51, thereby rotating the optical member 51 at a constant angular speed. Since the interval (time) between FG pulses is known when the optical member 51 is rotated at a constant speed, this is used as a theoretical speed value Vr (set angular speed, i.e., target speed value), and an error $\delta V$ of the calculated speed value Vn with respect to the theoretical speed value Vr is calculated by the following formula:

$$\delta V = Vr - Vn$$

The theoretical speed value Vr and the calculated speed value Vn are originally real numbers. In order to achieve high-speed computing by the CPU 93, however, it is possible to normalize the values in advance, for example, as an integer number of 16 bits. The P term that is the proportional term of the PI control is calculated by multiplying $\delta V$ by an appropriate gain Gp as follows:

$$P = Gp \times \delta V$$

When the gain is infinite, the speed control can be performed by using the P term alone. However, since the gain is typically finite and speed offset occurs, the I (integral) term is calculated by integrating the error $\delta V$ and multiplying this by an appropriate gain Gi as follows:

$$I = Gi \times \Sigma(\delta V)$$

P+I is a speed command value, and the CPU 93 sends the speed command value to a pulse width modulator (PWM) 96. Based on the speed command value, the pulse width modulator 96 calculates the ON-duty ratio in a predetermined period. A signal (PWM signal) whose pulse width is modulated based on the duty ratio is output to a 3-phase driver 97. The 3-phase driver 97 internally has a 3-system push-pull type transistor circuit 98, where rotation driving is performed by controlling the electric current to flow through each of the rotation driving coil 81 connected by star connection based on the PWM signals output from the shift controller 14. For this electric current control, a conventional voltage regulator can be used instead of the pulse width modulator 96. Both the structures can rotate the optical member 51 at a plurality of different constant angular speeds by changing the target speed value used as the theoretical speed value Vr. In this manner, the rotation driving is controlled based on a circular motion period designated by the period setter 25 (see FIG. 2).

Next, explanation will be made on the position control of the optical member 51. As described above, the position detection of the optical member 51 is performed by the three axial magnetic sensors 40, and the three radial magnetic sensors 39 which also serve as an input source of the FG signal (speed information). These sensors detect magnetism of the upper magnet 56 and the magnetized portion provided in the radial magnet 55, respectively. The detected value is converted into a digital signal by A/D convertors 101a and 101b. The output of the A/D convertors 101a and 101b is 8 bits, and the CPU 93 of the computing processor 92 receives a position information signal of 8×3×2 bits in total.

The CPU 93 calculates an adjusting value for adjusting the deviation with respect to a theoretical value (the position relationship (known value) between the radial magnetic sensor 39 and the axial magnetic sensor 40 when the optical member 51 is in a regular position) based on the received position information signal, and sends this adjusting value (digital signal) to D/A convertors 102a and 102b. The D/A convertors 102a and 102b convert the digital signal to an analog signal. Based on the analog signal, a radial driving driver 103 and an axial driving driver 104 drive the radial position controlling coil 72 and the axial position controlling coil 71, respectively, thereby controlling the position of the optical member 51 in the optical capsule 50.

In this embodiment, the output from the radial magnetic sensor 39 and the axial magnetic sensor 40 directly shows distance information. Therefore, computing is performed only on the I term of the PI control.

Figure 10:
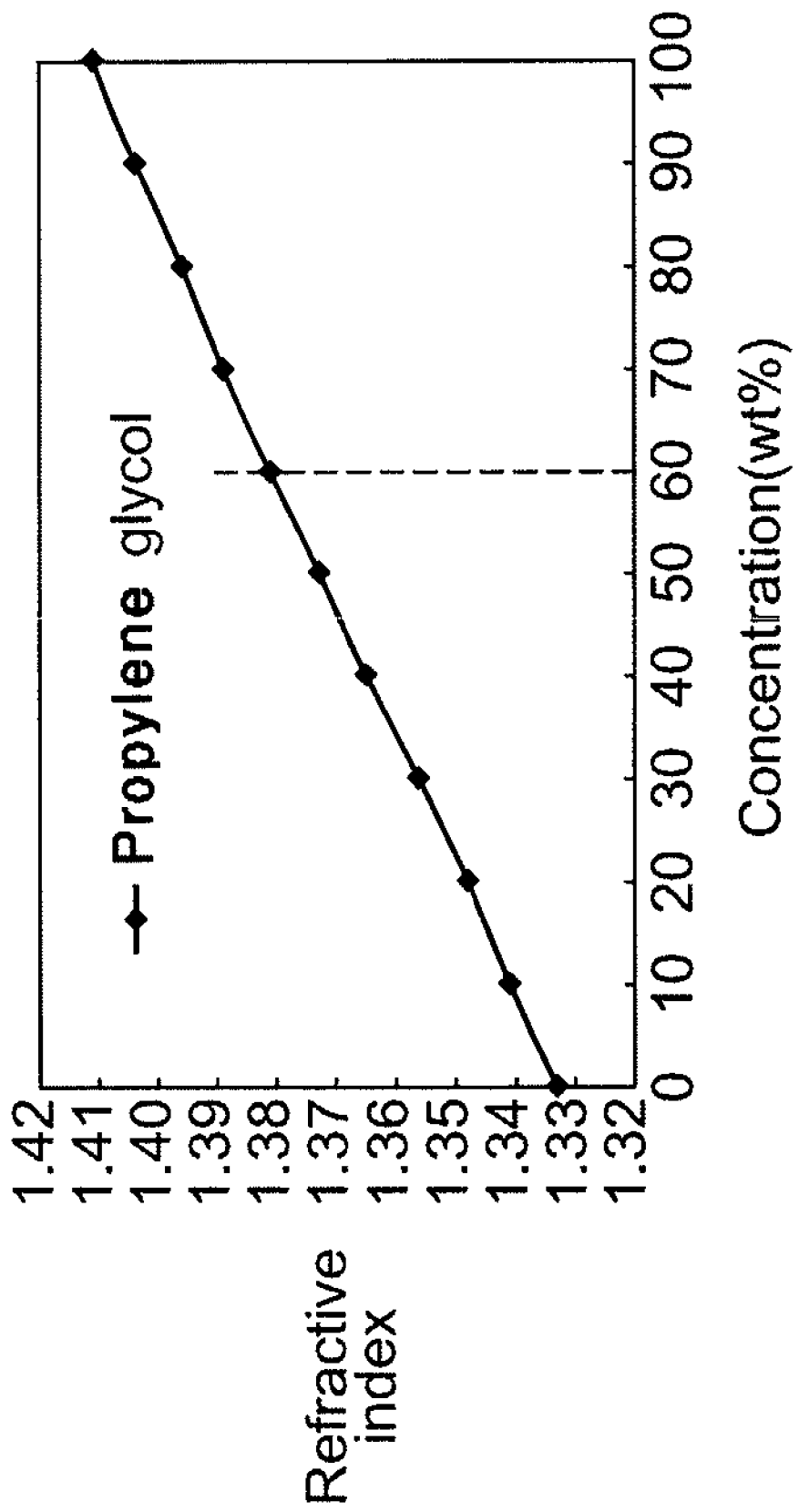
FIG. 10 is a graph illustrating variation in the refractive index with respect to the concentration of propylene glycol used as an anti-freeze solution shown in FIG. 2.

FIG. 10 is a graph illustrating variation in the refractive index with respect to the concentration of propylene glycol used as the anti-freeze solution 52 shown in FIG. 2. Hereinafter, explanation will be made on the significance of an anti-freeze solution 49 filled in the optical capsule 50 with reference to FIG. 10 and FIG. 4.

When the image capturing device 1 is placed outdoors (for example, when it is used as a monitoring camera), it needs to operate normally even in a frigid environment (for example, secure operation up to −20° C.). In a case of propylene glycol (hereinafter, referred to as PG), it is possible to secure operation up to −20° C. by setting the mixture ratio of PG and water to be 6:4.

As shown in FIG. 10, the PG concentration and the refractive index are substantially proportionate, which makes it possible to obtain a desired refractive index by adjusting the PG concentration. When the PG concentration is 60 wt % (the mixture ratio of PG and water is 6:4), the refractive index is around 1.38. Although the refractive index of a mixture of PG and water varies depending on the temperature, such variation will not cause a problem in the range of −20° C. to 20° C. because it is as small as variation of the third digit after the decimal point.

The optical shift mechanism 35 serves only to shift light incident upon the parallel plate 53 in parallel. Therefore, when the optical member 51 moves in parallel in a radial or axial direction, no change will occur in optical images formed on the image capturing element 31. On the other hand, when the angle of the parallel plate 53 with respect to the optical axis is unexpectedly changed due to the swing or the like of the optical member 51 in the optical capsule 50, error of the image-forming position will occur, which makes it difficult to capture images at a predetermined shift position. In sum, change of the angle of the parallel plate 53 with respect to the optical axis is the most serious problem in a case of using the parallel plate 53 as the optical shift mechanism.

When the parallel plate 53 is made of optical glass, the refractive index can be adjusted to be in a range of 1.43-2.14. The difference in the refractive index between the optical glass and the liquid 52 can be adjusted to be a desired value by adjusting the PG concentration. In this manner, it is possible to substantially reduce the shift width (optical shift amount) by the parallel plate 53 by adjusting the refractive index of the liquid 52 and the parallel plate 53. More specifically, when a liquid having a higher refractive index than that of the air and a smaller refractive index than that of the parallel plate 53 is used as the liquid 52, the difference in the refractive index with respect to the optical glass is smaller than a case where the parallel plate 53 is in direct contact with the air, which makes the shift width by the parallel plate 53 substantially smaller than a case where the parallel plate 53 is positioned in the air.

As described above, radial and axial position control is performed to the optical member 51. However, control error (error of the parallel plate 53 with respect to the target position) inevitably occurs in the above-described PI control due to the characteristics of feed-back control that the control is not performed until error occurs. When the thickness of the parallel plate 53 is made uniform, however, the inclination angle of the parallel plate 53 (the angle of the parallel plate 53 with respect to the radial direction) to obtain a desired shift width can be set to be larger in a case where the parallel plate 53 is positioned in the liquid 52 than a case where it is positioned in the air. Consequently, even in a case where the angle of the parallel plate 53 changes during operation of the image capturing device, its effect on the shift width can be reduced.

For example, the angle of the parallel plate 53 positioned in the air to obtain a desired shift width with respect to the radial direction is set to be θ1. When the parallel plate 53 is positioned in the liquid 52, the difference in the refractive index between the liquid 52 and the parallel plate 53 is smaller than the difference in the refractive index between the air and the parallel plate 53 because the refractive index of the liquid 52 is greater than that of the air and smaller than that of the parallel plate 53. Here, since the optical shift width depends on the difference in the refractive index, when the thickness of the parallel plate 53 is uniform, the shift width becomes smaller as the difference in the refractive index becomes smaller. Consequently, in order to obtain the same shift width as θ1 by the parallel plate 53 positioned in the liquid 52, the angle of the parallel plate 53 with respect to the radial direction (θ2) needs to be greater than θ1. Further, when variation in the inclination angle of the parallel plate 53 is within a certain amount, the effect of such variation on the shift width becomes substantially smaller as the angle θ2 becomes greater.

In the present embodiment, an anti-freeze solution is used as the liquid 52. However, when the installment environment of the image capturing device 1 is limited to indoor, it is not always necessary to use an anti-freeze solution. In such a case, it may be possible to fill the optical capsule 50 with another fluid (such as water) having a greater refractive index than that of the air and a smaller refractive index than that of the parallel plate 53. A similar effect as described above can be obtained by adjusting the refractive index of optical glass or the like used as the parallel plate 53 based on the refractive index of the fluid in this case. As the material of the parallel plate 53, acrylic resin or the like can be used as well as optical glass. Also, the anti-freeze solution does not need to be water-based. For example, transparent silicon oil may be used. Since there is no likelihood that rust will occur in the radial magnet 55 or the like in this case, anti-rust treatments such as resin coating are not necessary.

Figure 11A:
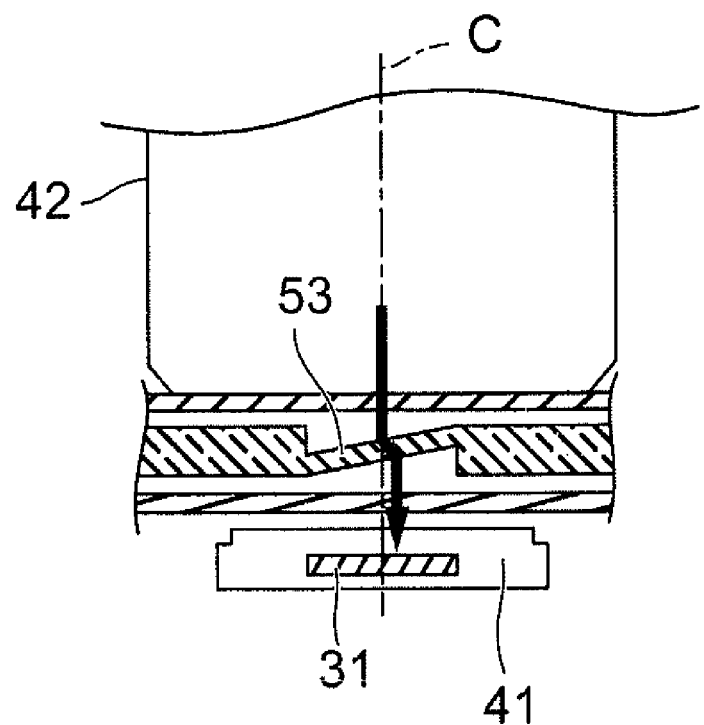
FIGS. 11A and 11B are cross-sectional views illustrating incidence statuses of light toward the image capturing element shown in FIG. 4.
Figure 11B:
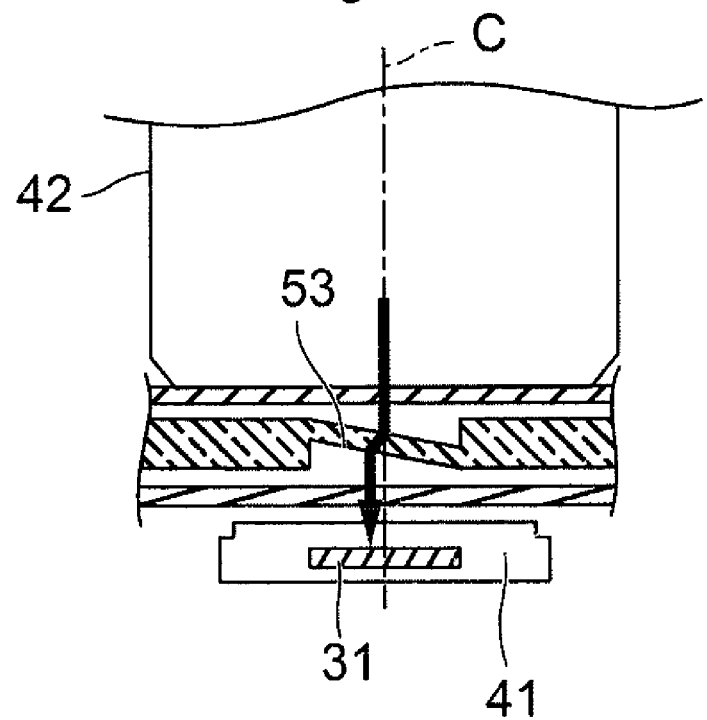

FIGS. 11A and 11B are a cross-sectional view illustrating incidence status of light toward the image capturing element. FIG. 11A shows a state where the light path of the incident light is shifted to the right at maximum, and FIG. 11B shows a state where the parallel plate 53 is rotated by 180 degrees from the state shown in FIG. 11A. When the parallel plate is further rotated by 180 degrees from the state shown in FIG. 11B, it returns to the state shown in FIG. 11A.

As shown in FIG. 11, the parallel plate 53 of the optical member 51 is inclined with respect to the optical axis C of the lens unit 42, thereby refracting incident light through the lens unit 42 and changing the position of light incident upon the light-receiving surface of the image capturing element 31 depending on the rotation position of the parallel plate 53. When the optical member 51 is rotated by the optical shift mechanism 35, an optical image formed on the light-receiving surface of the image capturing element 31 moves as though a circle is drawn in a period (circular motion period) that corresponds to the rotation speed of the optical member 51, which makes it possible to slightly displace the optical image relative to the image capturing element 31.

Specifically, the shift amount by the optical shift mechanism 35 is set to be 3.75 μm that corresponds to one pixel pitch of the image capturing element 31 (1,300,000 pixels) where optical images are formed. Further, the thickness of the parallel plate 53 is set to be 0.1 mm and the inclination angle of the parallel plate 53 is set to be 20 degrees.

Here, when the refractive index of the parallel plate 53 to obtain the above-described shift amount (3.75 μm) is calculated, the refractive index becomes 1.53. As described in detail later, light incident upon the parallel plate 53 after passing through the mixed solution of PG and water is caused to shift and is emit while maintaining its incident angle (i.e., in parallel), and an optical image formed on the image capturing element 31 moves so as to draw a circular orbit having a diameter of 7.5 μm by rotating the parallel plate 53. With this, it is possible to obtain a shift amount that corresponds to the diameters of two pixels. The shift width can be changed by adjusting the thickness and the inclination angle of the light path area of the parallel plate 53, and the PG concentration.

With the image capturing device 1 having the above-described structure, it is possible to achieve a super-resolution image capturing device that can generate high quality images with a simple mechanism. Also, by increasing the thickness of the parallel plate 53, the rigidity of the inclined portion can be improved and a glass material having a heavy weight can be selected, which results in cost reduction. For example, the thickness of the parallel plate 53 can be 0.2 mm and the inclination angle of the parallel plate 53 can be 20 degrees. In this instance, the refractive index of the parallel plate to obtain the above-described shift amount is 1.45.

Figure 12A:
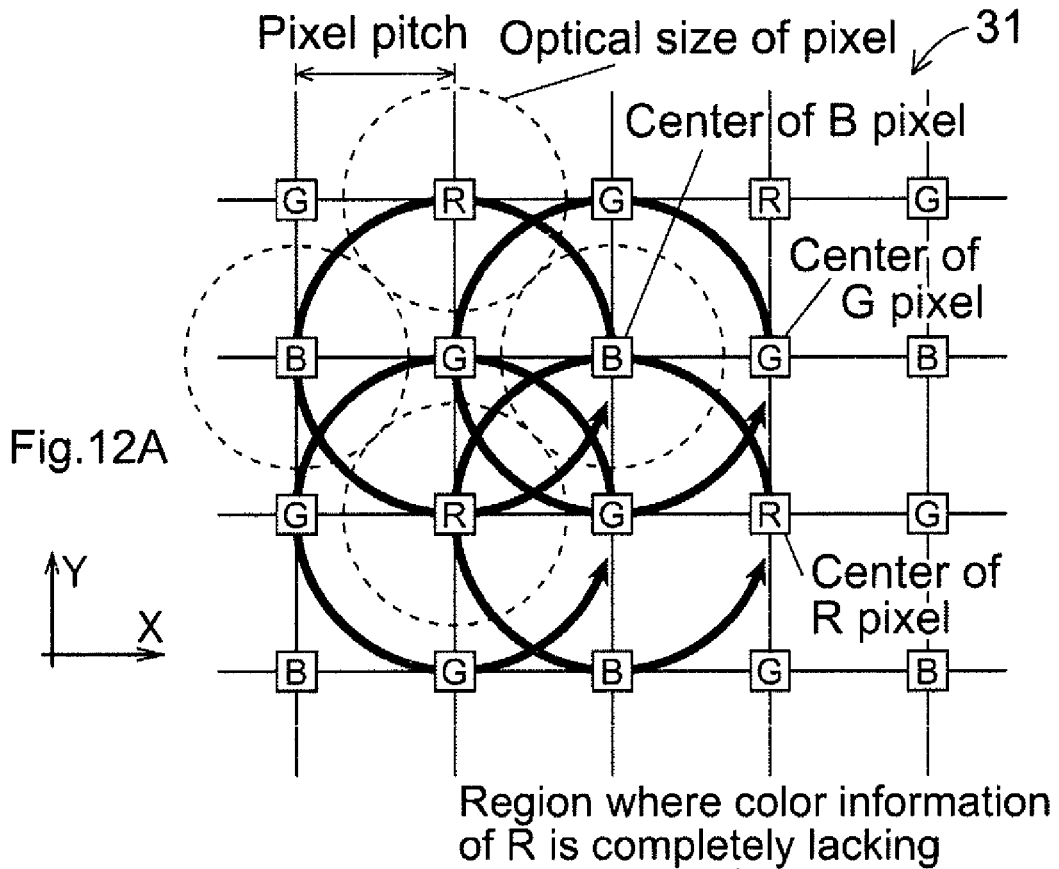
FIGS. 12A and 12B are schematic diagrams illustrating statuses of a circular motion of pixels relative to an optical image.
Figure 12B:
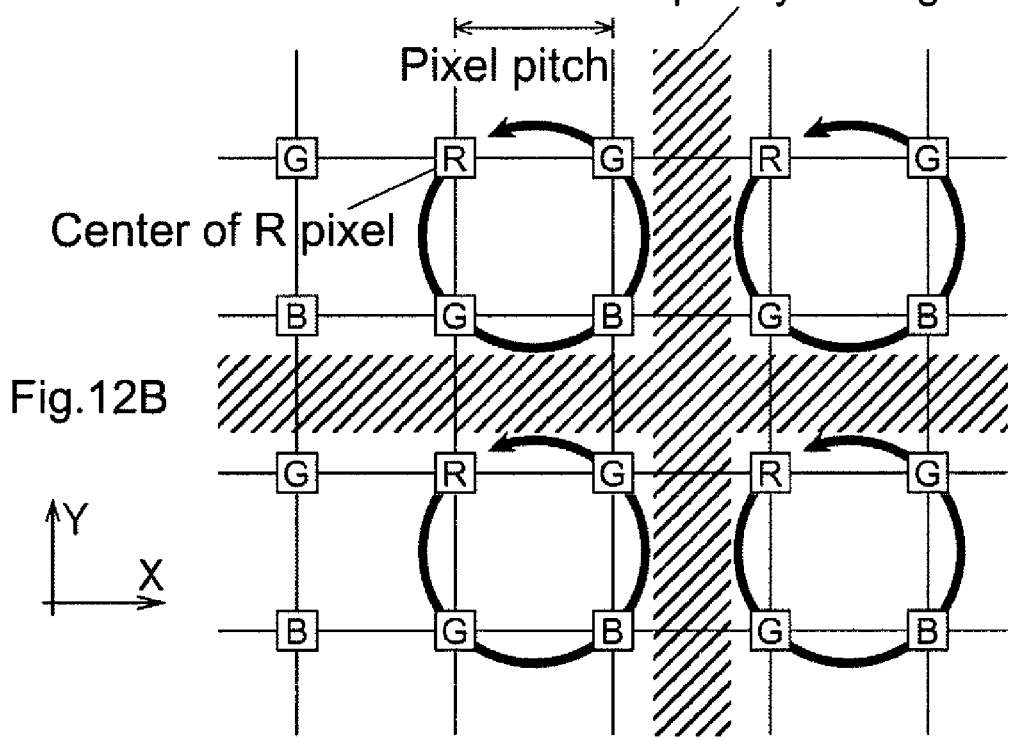
Figure 13A:
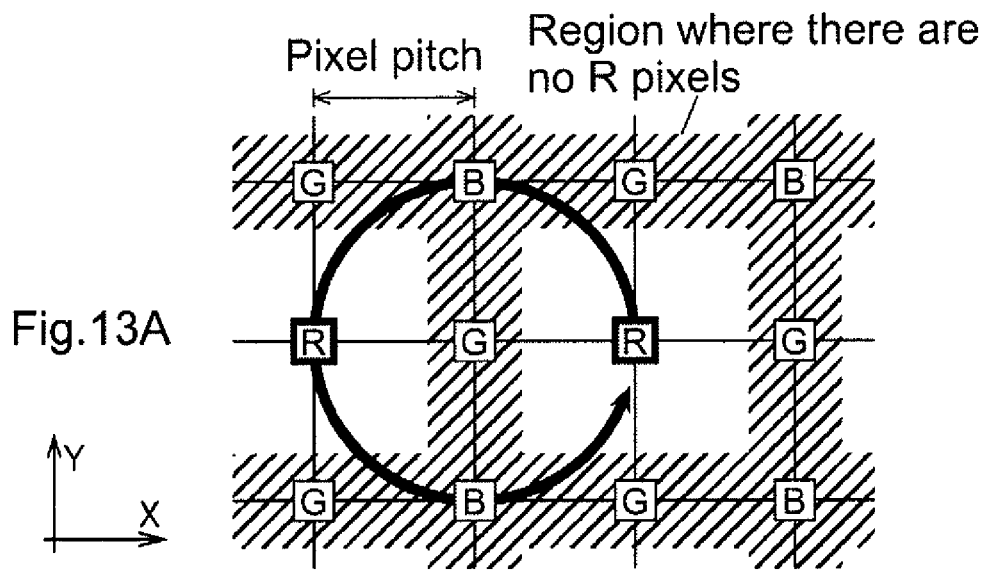
FIGS. 13A, 13B and 13C are schematic diagrams illustrating statuses of a circular motion of pixels relative to an optical image.
Figure 13B:
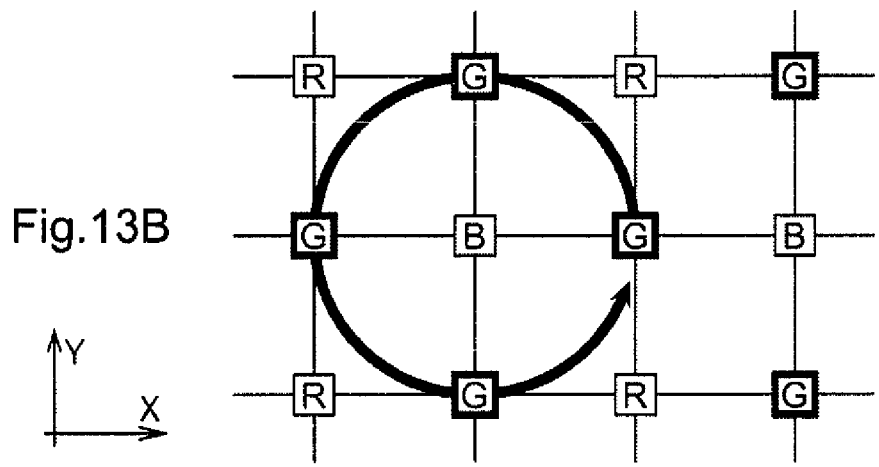
Figure 13C:
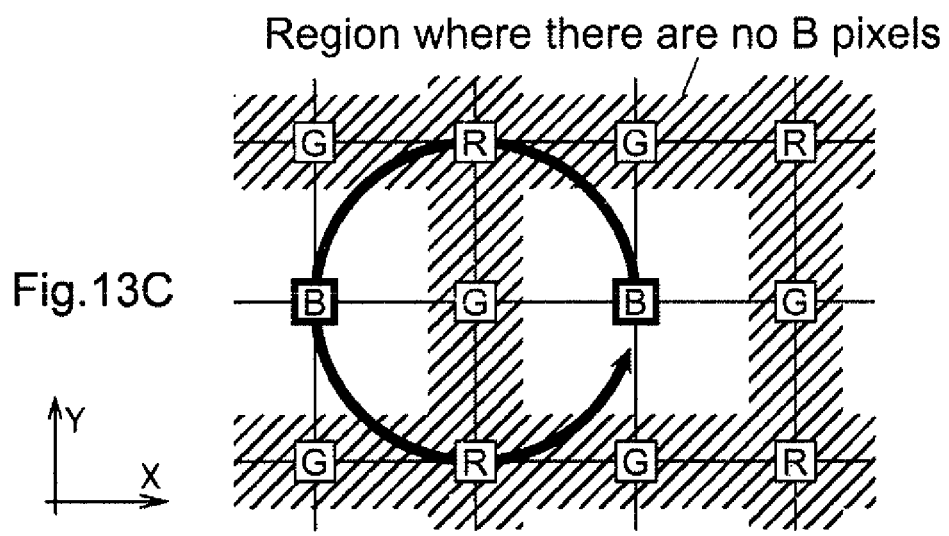

FIGS. 12A and 12B, and FIGS. 13A-13C are schematic diagrams illustrating statuses of circular motion of pixels relative to an optical image. As shown in FIGS. 13A-13C, the image capturing element 31 is a single image capturing device where R pixels that receive an R (Red) component of incident light, B pixels that receive a B (Blue) component thereof, and G pixels that receive a G (Green) component thereof are arranged based on a Bayer array. In this Bayer array, G pixels are arranged in a zigzag pattern (a checkered flag pattern) so as to occupy ½ of all the pixels, and R pixels and B pixels are arranged dispersedly in positions other than the positions where G pixels are arranged so as to occupy ¼ of all the pixels, respectively. In the drawings, X-axis shows a main-scanning direction, and Y-axis shows a sub-scanning direction. The same can be applied hereinafter.

The image capturing element 31 has the same pixel structure as Quad VGA (1280×960 pixels). The sensor size is ⅓ inch, and the pixel pitch that is an interval between the adjacent pixels is 3.75 μm in both the main-scanning direction and the sub-scanning direction. As described above, the diameter of the circular orbit is 7.5 μm, which means that the diameter of the circular motion of the parallel plate 53 is set to be twice as much as the pixel pitch of the image capturing element 31.

Here, the optical image is displaced with respect to the fixed pixels of the image capturing device 31 as shown in FIGS. 11A and 11B. However, for convenience, the following explanation will be made based on the relative displacement of the pixels with respect to the optical image as if the pixels move with respect to the optical image. Also, each pixel receives light within a range that is substantially shown as an optical size. However, for convenience, only the center of each pixel is shown in the following explanation.

As shown in FIG. 12B, when the diameter of the circular motion is set to √2 times as much as the pixel pitch, for example, it deviates from the moving range of R pixels, which generates regions where the color information of R is completely lacking. Likewise, it deviates from the moving range of B pixels, which generates regions where the color information of B is completely lacking. Incidentally, the diameter of the circular motion is set to √2/2 times as much as the pixel pitch in the same manner as conventional art, the region where the color information of R is completely lacking is increased, which makes it impossible to reproduce high-resolution images of high fineness even if super-resolution processing is performed to low-resolution images captured by a typical single-type color image sensor having a Bayer array.

In contrast, when the diameter of the circular motion is set to 2 times as much as the pixel pitch as shown in FIG. 12A, R pixels and B pixels can be moved to the regions where there are no R pixels and B pixels as shown in FIG. 13A and FIG. 13C. Consequently, it is possible to prevent the image capturing position from being unevenly located, which can achieve high quality of high-resolution images obtained by super-resolution processing. Further, as shown in FIG. 13B, since the pixel number of G pixels is great (½ of all) and G pixels arranged in a zigzag pattern can also scan their peripheral regions, it is possible to perform exhaustive sampling of optical images.

On the other hand, when the diameter of the circular motion is twice or more times larger than the pixel pitch, there are no strip-shaped regions where R pixels and B pixels cannot be captured. However, when the diameter of the circular motion is increased while keeping the angular speed of the circular motion constant, the displacement speed (i.e., circumferential speed) of an optical image is increased. When the same image capturing period (period that electric charge is stored in the image capturing element 31) is given in this instance, an optical image will move a greater distance, which causes increase in the integral effect, that is, causes blurring of the image (the same state as motion blur occurs). Consequently, high-frequency components are lost by the pixel integral, which may reduce the effect of super-resolution processing.

Figure 14:
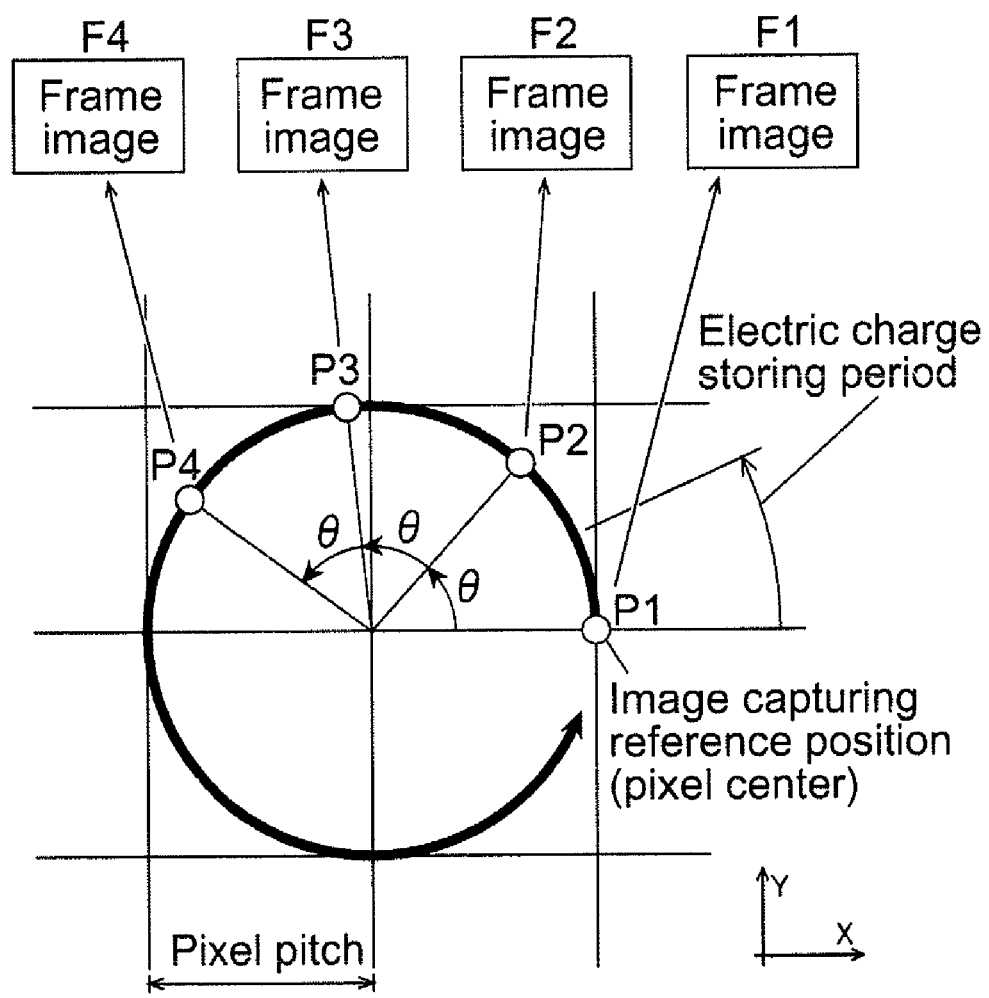
FIG. 14 is a schematic diagram illustrating a status of a captured image and an image created by the captured image.

Next, explanation will be made on image capturing (sampling). FIG. 14 is a schematic diagram illustrating a status of a captured image and an image created by the captured image. As shown in FIG. 14, image capturing is performed while circular motion of the pixels relative to the optical image is caused to occur continuously in one direction at a constant speed, so as to sequentially generate frame images F1, F2, . . . whose image capturing position is slightly shifted. Image capturing reference positions P1, P2, . . . shown in the drawings illustrate the timing of the image capturing, and one frame image is generated at each position. More specifically, the center of the pixel at the time of initiating the image capturing is shown as the image capturing reference position here. Electric charge is initiated at each image capturing reference position. Electric charge is completed before the next image capturing reference position, and pixels signals are output.

The rotation speed of the circular motion is stably maintained by the above-described PI control, and the reference of the rotation position of the parallel plate 53 (see FIGS. 11A, 11B, etc.) is controlled by the above-described origin sensor 65 (FIG. 6). Further, since the effect of inclination angle variation of the parallel plate 53 on the shift width (shift position) is reduced to be small, it is possible to extremely accurately grasp the image capturing position of the frame image to be captured at each timing.

Hereinafter, explanation will be made with reference to FIG. 9 and FIG. 2.

The information regarding the image capturing position is serially generated in the computing processor 92 based on the output of the radial magnetic sensor 39 and the origin sensor 65 (see FIG. 9). Then it is output from the shift controller 14 that includes the computing processor 92 to the memory 23, and stored in association with the image data per frame that is output from the image capturing portion 11. In the course of super-resolution processing, the information regarding the image capturing position is referred in the super-resolution processor 24, and the positioning process is simplified (see FIG. 2).

In order to achieve appropriate high resolution in the super-resolution processing, uniform displacement in all the pixels is preferred, and it is not preferred that time difference occurs at the timing for storing electric charge between the pixel lines. Thus, the present embodiment uses a global shutter method where shutter operation of all the pixels is performed at the same timing.

Also, by performing more image capturing (sampling) while the pixel performs a single set of circular motion, it is possible to improve the quality of the high-resolution image obtained by the super-resolution processing. Specifically, the circular motion period is set to be non-integer times greater than the image capturing period in this embodiment. With this, it is possible to perform image capturing in many different positions by repeating circular motion, so as to generate many images whose image capturing positions are slightly different from each other. Consequently, it is possible to improve the quality of the high-resolution image obtained by the super-resolution processing. On the other hand, when the circular motion period is set to be integer times greater than the image capturing period, there will be no variation in the image capturing reference position even after repeating circular motion, and the number of the image capturing reference position is limited to a number that is achieved by a single set of circular motion.

Hereinafter, explanation will be made on one example of the image capturing reference position with reference to FIGS. 15A-15C by setting the ratio between the circular motion period and the image capturing period to be a specific one. FIGS. 15A-15C are a schematic diagram illustrating status of the image capturing reference position in one example of the ratio of the image capturing period to the circular motion period. In FIGS. 15A-15C, the pixel pitch is shown as 1.

In the example shown in FIGS. 15A-15C, the circular motion period is set to be 7.5 times greater than the image capturing period. When the image capturing period is set to be 30 ms (about 30 frame/s), for example, the circular motion period becomes 225 ms (=30 ms×7.5). In this instance, the image capturing reference position returns to the original position in the second cycle of the circular motion, and image capturing (sampling) is performed 15 times while the circular motion occurs twice. The image capturing reference positions are spaced apart from each other at a relative angle of 48 degrees (=360 degrees/7.5). Super-resolution effects are restrained in a case where blurring (integral effect) occurs in the image. It is, therefore, important to select the period for storing electric charge (shutter speed) in the image capturing element 31. From this viewpoint, the shutter speed should be as high as possible. On the other hand, the sensitivity might easily be deteriorated when the shutter speed is high. Thus, it is preferable to compensate the gain while prioritizing the shutter speed corresponding to the light amount (brightness) of the object. In the present embodiment, the shutter speed is set to be 1/250 sec (4 ms). When the shutter speed was set to this extent with respect to the image capturing period of 30 ms, no adverse effects by image blurring in the super-resolution processing were visually observed.

As shown in FIG. 15A, image capturing is performed at the image capturing reference positions P1-P8 in the first time of the circular motion. As shown in FIG. 15B, image capturing is performed at the image capturing reference positions P9-P15 in the second time of the circular motion. Each of the image capturing reference positions P9-P15 is located in the middle position between two adjacent image capturing reference positions in the first time of the circular motion (for example, P1 and P2). When the first time and the second time of the circular motion are combined, the image capturing reference positions are spaced apart from each other at a relative angle of 24 degrees as shown in FIG. 15C.

Here, it is possible to select two processing modes. The first processing mode is to perform super-resolution processing based on 8 images obtained by image capturing at the image capturing reference positions P1-P8 of the first time of the circular motion, and the second processing mode is to perform super-resolution processing based on 15 images obtained by image capturing at the image capturing reference positions P1-P15 of both the first time and the second time of the circular motion.

In the first processing mode, two image capturing reference positions different in the positions in both the X-axis and Y-axis directions are set within a range of one original pixel. Consequently, it is possible to achieve high resolution substantially twice as high as the original resolution of the image capturing element 31 with respect to each of the X-axis and Y-axis directions. In the second processing mode, four image capturing reference positions different in the positions in both the X-axis and Y-axis directions are set within a range of one original pixel. Consequently, it is possible to achieve high resolution substantially four times as high as the original resolution of the image capturing element 31 with respect to each of the X-axis and Y-axis directions.

Especially, in the second processing mode, each of the image capturing reference positions P9-P15 determined in the second time of the circular motion is positioned at an intermediate position between two adjacent ones of the image capturing reference positions P1-P8 determined in the first time of the circular motion. Consequently, the image capturing reference positions are uniformly dispersed without being unevenly located, which makes it possible to generate images excellent in the compatibility with super-resolution processing.

It is also possible to perform super-resolution processing in the image capturing device 1 in the middle of performing image capturing in the image capturing device 1. In such a case, one super-resolution processing may be performed every time 15 images are generated by performing circular motion twice in the second processing mode.

On the other hand, in the first processing mode, super-resolution processing may be performed every time 8 images are generated by sequentially shifting the image capturing reference position. Specifically, first, super-resolution processing is performed with 8 images obtained by image capturing at the image capturing reference positions P1-P8. Second, super-resolution processing is performed with the 8 images obtained by image capturing at the image capturing reference positions P9-P15 and P1. Likewise, the image capturing reference position is shifted one by one in such a manner as the image capturing reference positions P2-P9 are used for the third time, and the image capturing reference positions P10-P15, P1 and P2 are used for the fourth time.

As described above, two processing modes can be used without changing the circular motion period (rotation speed of the optical shift mechanism 35) and the image capturing period, which facilitates the control.

The first image used in the super-resolution processing of each mode is not limited to the image obtained by image capturing at the original position P1. The first processing mode can be performed with 8 images captured while one circular motion is performed at optional image capturing reference positions, and the second processing mode can be performed with 15 images captured while circular motion is performed twice at optional image capturing reference positions.

The above-described processing can be applied to super-resolution processing that is performed with frame images stored in the memory 23 of the image processing device 2 as shown in FIG. 3. It also can be applied to super-resolution processing that is performed in the middle of image capturing by the image capturing device 1. Especially, in the latter case, since the image capturing starting position does not need to be returned to the original position P1 in accordance with switch of the processing mode, it is possible to generate high-resolution images having different resolution by immediately switching the processing mode.

As shown in FIG. 2, the image capturing period is designated with the inputting portion 26 of the image processing device 2 by a user. The circular motion period is determined by the period setter 25 based on the designated image capturing period, and a command signal regarding the determined circular motion period is transmitted to the image capturing device 1. The shift controller 14 of the image capturing device 1 operates the optical shift mechanism 35 at the rotation speed that corresponds to the designated circular motion period based on the command signal regarding the circular motion period obtained from the image processing device 2.

A user can also designate the processing mode (the first processing mode and the second processing mode). As shown in FIG. 3, in the case of performing super-resolution processing with frame images stored in the memory 23 of the image processing device 2, a user is allowed to designate the processing mode as well as the reference image, and super-resolution processing can be performed by reading out the frame images whose number corresponds to the designated processing mode with reference to the frame images designated as the reference image.

In the examples shown in FIGS. 16A-16C and FIGS. 17A-17C, the circular motion period is set to be 7.2 times greater than the image capturing period. In such a case, the image capturing reference position returns to the original position in the fifth time of the circular motion, and image capturing (sampling) is performed 36 times while circular motion is performed 5 times. The image capturing reference positions are spaced apart from each other at a relative angle of 50 degrees (=360 degrees/7.2).

In the first time of the circular motion, as shown in FIG. 16A, image capturing is performed at the image capturing reference positions P1-P8. The second time to the fifth time are explained as follows by paying attention to the positions between the image capturing reference positions P1 and P2 of the first time. That is, in the second time shown in FIG. 16B, a new image capturing reference position Ps_2 is added between the image capturing reference positions P1 and P2. Likewise, a new image capturing reference position Ps_3 is added in the third time shown in FIG. 16C, a new image capturing reference position Ps_4 is added in the fourth time shown in FIG. 17A, and a new image capturing reference position Ps_5 is added in the fifth time shown in FIG. 17B between the image capturing reference positions P1 and P2, respectively.

In this manner, a new image capturing reference position is added between the two adjacent image capturing reference positions of the first circular motion every time the circular motion is repeated. When the image capturing reference positions of the first time to the fifth time are combined, 9 image capturing reference positions different in both the X-axis direction and the Y-axis direction are provided within a range of one original pixel, which means that image capturing is performed 9 times at slightly displaced image capturing positions. Consequently, it is possible to achieve high resolution by increasing the resolution to be 10 times higher than the original resolution of the image capturing element with respect to each of the X axis and the Y axis.

When such high resolution is not required, it is sufficient to perform super-resolution processing based on 8 images obtained by image capturing at the 8 image capturing reference positions determined in the first circular motion in the same manner as the example shown in FIGS. 15A-15C. As higher resolution is required, the number of the circular motion may be increased to be twice, three times, and four times.

Incidentally, the circular motion period is set to be 7.5 times greater than the image capturing period in the example shown in FIGS. 15A-15C, and the circular motion period is set to be 7.2 times greater than the image capturing period in the examples shown in FIGS. 16A-16C and FIGS. 17A-17C. However, the present invention is not limited to these.

Here, in a case of Rs=circular motion period/image capturing period, Fn(Rs) is determined as the following formula:

$$Fn(Rs)=Rs-\text{int}(Rs) \quad \text{(Formula 1)}$$

"int" refers to a function to return the maximum integer not exceeding the value inside the parenthesis. The same can be applied hereinafter.

Fn(Rs) is an inverse of Nr that is the number of the circular motions of an optical image to return the image capturing reference position to the initial position as follows:

$$Nr=1/Fn(Rs) \quad \text{(Formula 2)}$$

The following formula shows the number S1 of image capturing where the super-resolution processing is performed based on the images captured by the first processing mode where only one circular motion is performed:

$$S1=\text{int}(Rs)+1 \quad \text{(Formula 3)}$$

The following formula shows the number S2 of image capturing where the super-resolution processing is performed based on the images captured by the second processing mode where circular motion is performed twice:

$$S2=Rs \times Nr \quad \text{(Formula 4)}$$

In the example shown in FIGS. 15A-15C, the ratio Rs of the circular motion period to the image capturing period is set to be 7.5. Thus, Fn(Rs) is 7.5−int(7.5)=0.5 based on Formula 1, and Nr is 1/0.5=2 from Formula 2, which means that the image capturing reference position returns to the original position in the second time of the circular motion. Also, as for the numbers S1 and S2 of image capturing in the first processing mode and the second processing mode, S1 is 7+1=8 from Formula 3, and S2 is 7.5×2=15 from Formula 4, respectively.

In the examples shown in FIGS. 16A-16C and FIGS. 17A-17C, the ratio Rs of the circular motion period to the image capturing period is set to be 7.2. Thus, Fn(Rs) is 7.2−int(7.2)=0.2 based on Formula 1, and Nr is 1/0.2=5 from Formula 2, which means that the image capturing reference position returns to the original position in the fifth time of the circular motion. Also, as for the numbers S1 and S2 of image capturing in the first processing mode and the second processing mode, S1 is 7+1=8 from Formula 3, and S2 is 7.2×5=36 from Formula 4, respectively.

As described above, when the ratio Rs of the circular motion period to the image capturing period is set such that the number after the decimal point is 0.5 such as 7.5 or 10.5, the image capturing reference position returns to the original position in the second time of the circular motion. When the ratio Rs is set such that the number after the decimal point is 0.2 such as 7.2 or 10.2, the image capturing reference position returns to the original position in the fifth time of the circular motion. Further, when the ratio Rs is set such that the number after the decimal point is 0.1 such as 7.1 or 8.1, the image capturing reference position returns to the original position in the tenth time of the circular motion. As the number after the decimal point of Rs decreases, the number of the circular motion to return the image capturing reference position to the original position increases, which makes it possible to set the number of different image capturing reference positions more and achieve higher resolution.

Also, as the integer part of the ratio Rs of the circular motion period to the image capturing period increases, the number of image capturing per circular motion increases, which makes it possible to achieve higher resolution. For practical purposes, it is preferable to improve the resolution so as to be two or more times higher with respect to both the X axis direction and the Y axis direction. On the basis that optical shift is performed within a range that is twice as much as a pixel pitch in the image capturing element 31 having the above-described Bayer array, Rs is preferably equal to or greater than 4.5.

In the above-described examples, the circular motion period and the image capturing period have a common divisor. However, these may be "relatively prime", which makes it possible to perform image capturing extremely finely.

According to the present invention, since the resolution is determined based on the ratio Rs of the circular motion period to the image capturing period, the resolution can be adjusted by fixing either one of the circular motion period and the image capturing period, and increasing or decreasing the other. For example, the resolution can be improved by decreasing the image capturing period so as to increase the number of image capturings per one circular motion. However, the image capturing period needs to be adjusted corresponding to the object illumination or the environmental brightness. Typically there are many cases where the time for storing electric charge in the image capturing element 31 is kept long by increasing the image capturing period when the object is dark, which limits the appropriate range of the image capturing period. Thus, after the image capturing period is fixed, the circular motion period may be adjusted such that the ratio Rs of the circular motion period to the image capturing period is a desired value. In a case where the image capturing period cannot be decreased, the circular motion period can be set to be long, that is, the rotation speed of the optical member 51 by the optical shift mechanism 35 can be set to be low.

Generally, as the object illumination becomes low, the SNR (signal noise ratio) deteriorates. Since high-resolution images are generated by superposing (i.e., synthesizing) a plurality of temporally consecutive frame images in super-resolution processing, particularly in multi-frame reconstruction-based super-resolution processing, the more frame images being used, the more advantageous it is in terms of the SNR. When the object illumination becomes low, therefore, the SNR can be improved by substantially increasing the sensitivity through the increased image capturing period, and increasing the number of image capturing (sampling) per one circular motion through the increased circular motion period. Specifically, the ratio Rs of the circular motion period to the image capturing period can be set to be 10.5, for example.

In the present invention, since the whole image is equally shifted by pixel displacement by the optical shift mechanism 35, it may be basically disadvantageous in terms of the compression ratio. Typically, however, only edge portions affect the compression ratio in an image compression method where a predicted error between frames is transmitted, and the constant portion of an image has almost no effect. Thus, under normal use, even if compression is performed by MPEG4 or the like, the compression ratio will not greatly increase. When the present invention is applied, therefore, there is no need to use a high-speed network.

According to the present invention, with the simple configuration that the circular motion period is set to be non-integer times greater than the image capturing period, it is possible to control the pixel displacement status in various ways, in particular, by performing image capturing at many positions that are uniformly dispersed, which makes it possible to easily obtain an original image that is suitable for super-resolution processing. Further, by adjusting the ratio of the circular motion period to the image capturing period, it is possible to freely control the resolution of the high-resolution image obtained by super-resolution processing.

In the above-described examples, in order to cause the image capturing element 31 and an optical image formed on the light-receiving surface of the image capturing element 31 to perform relative circular motion in the optical shift mechanism 35, the optical member 51 provided with the parallel plate 53 is caused to perform circular motion in a state where the image capturing element 31 is fixed. However, another configuration is possible where the image capturing element 31 is caused to perform circular motion in a state where an optical image is fixed.

Also, in the above-described examples, circular motion is driven by a magnetic rotating force. However, circular motion can be driven by a single-axis (direct-acting) type actuator, such as e.g., by using a piezo element or magnetostrictive element. When the image capturing element is caused to perform circular motion by a single-axis actuator, two actuators in the X-axis direction and the Y-axis direction are connected to the image capturing element, and driven independently of each other based on sine waves in the X-axis direction and cosine waves in the Y-axis direction. With this, the image capturing element displaced by these actuators is caused to perform circular motion with respect to an optical image. The circular motion can be adjusted by controlling the periods of sine waves and cosine waves. Further, by adjusting the amplitude or the phase of sine waves serving as a base of displacement with respect to the X-axis and the Y-axis, an optical image will draw a Lissajous curve that is determined as $x = A \cos(at)$ and $y = B \sin(bt+\delta)$, where A and B are amplitudes, a and b are frequencies, and $\delta$ is a phase shift. The dispersion of the image capturing position can be improved by adapting this Lissajous curve. There is no need to say that the function and the effect of the present invention can be reflected directly by making the repeating period of the Lissajous curve non-integer times greater than the image capturing period.

Second Embodiment

Figure 18:
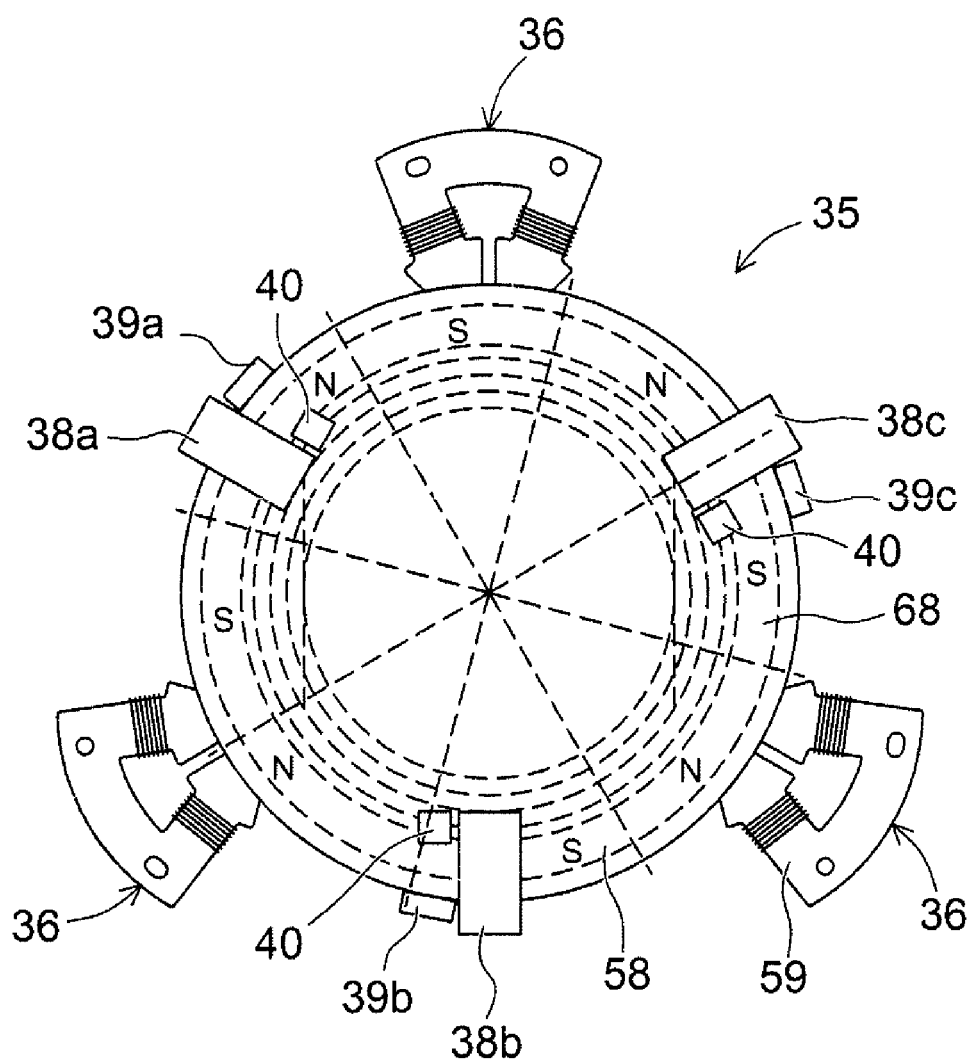
FIG. 18 is a plain view of the optical shift mechanism according to a second embodiment of the present invention.

FIG. 18 is a plain view of the optical shift mechanism according to a second embodiment of the present invention. In FIG. 18, the same elements as in the above-described first embodiment have the same numerical reference. Further, it should be considered the same as the first embodiment regarding any matters that are not discussed in the second embodiment.

The second embodiment is different from the first embodiment in that the optical shift mechanism 35 has a similar structure to an inner-rotor type 3-phase motor of 6 slots and 8 poles (in the first embodiment, 12 slots and 16 poles).

As shown in FIG. 18, in the optical shift mechanism 35, the radial magnet 55 has the magnetized portion 68 constructed by eight magnetic poles that are magnetized as an N pole and an S pole alternately along the circumferential direction thereof. Three magnetic rotation driving portions 36 are provided along the circumferential direction of the optical capsule (not shown in the drawing) at the same interval, and oppose the magnetized portion 68 of the radial magnet 55.

The position controllers 38a, 38b, and 38c, that are driven based on position information detected by the radial magnetic sensors 39a, 39b, and 39c, respectively, are provided in the vicinity of the corresponding radial magnetic sensors. This structure makes is possible to simplify the device and reduce the cost.

Third Embodiment

Figure 19:
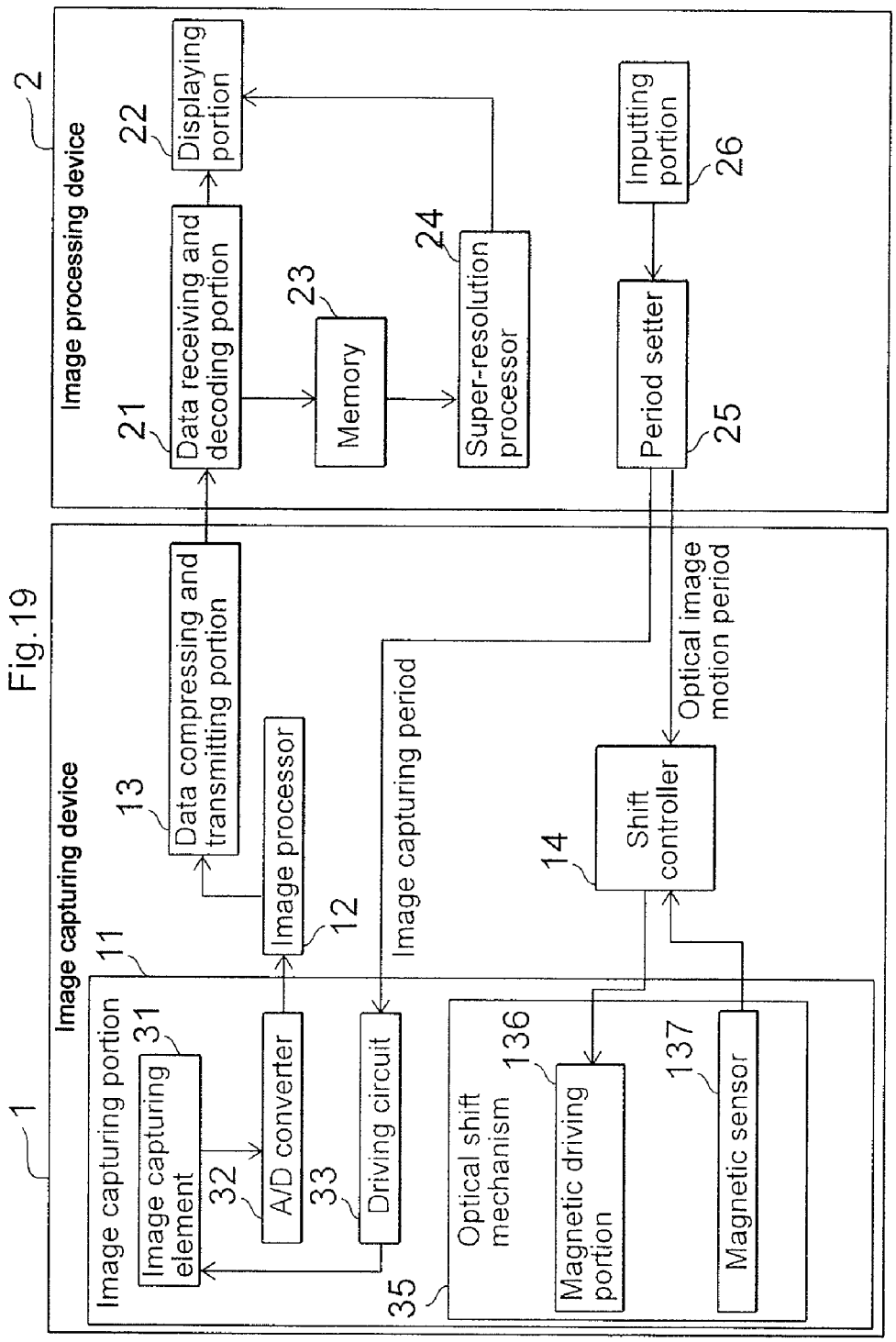
FIG. 19 is a block diagram illustrating a schematic configuration of an image capturing device and an image processing device of a network camera system according to a third embodiment of the present invention.

FIG. 19 is a block diagram illustrating a schematic configuration of an image capturing device and an image processing device of a network camera system according to a third embodiment of the present invention. In FIG. 19, the same elements as in the above-described first embodiment have the same numerical reference. Further, it should be considered the same as the first embodiment regarding any matters that are not discussed in the third embodiment.

The optical shift mechanism 35 has a magnetic driving portion 136 that drives the optical member for slightly displacing an optical image by a magnetic rotation force. The rotating portion of the optical shift mechanism 35 has a magnetized portion that is not shown in the drawing, and a magnetic sensor 137 detects position information of the magnetized portion so as to be output to the shift controller 14.

Figure 20:
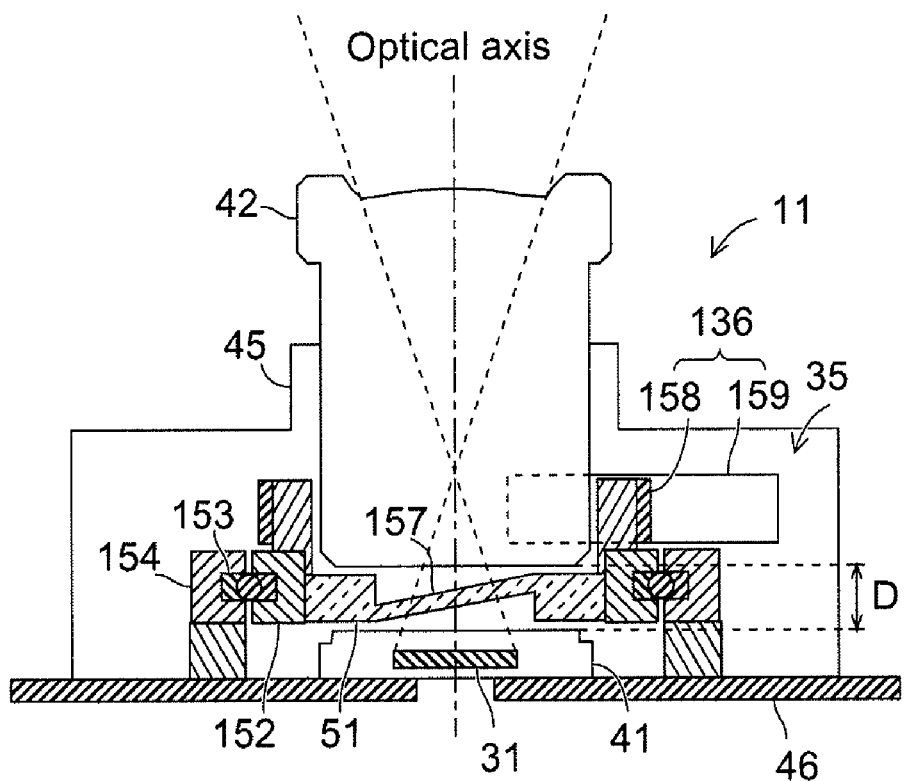
FIG. 20 is a cross-sectional view illustrating an image capturing portion of the image capturing device shown in FIG. 19.

FIG. 20 is a cross-sectional view illustrating the image capturing portion 11 of the image capturing device 1 shown in FIG. 19.

The optical shift member 35 has the optical member 51 provided between the sensor module 41 and the lens unit 42; an inner ring 152 that integrally retains the optical member 51; an outer ring 145 that retains the inner ring 152 in a rotatable manner through a ball bearing 153; and the magnetic driving portion 136 that drives the optical member 51 and the inner ring 152 by a magnetic rotation force.

The optical member 51 has a parallel plate 157 that is inclined at a predetermined angle with respect to the optical axis of the lens unit 42. The inner ring 152 and the outer ring 154 have an annular shape placing the optical axis in the center. The inner ring 152 is arranged so as to be rotatable around the optical axis, while the outer ring 154 is fixed to the base 46. The magnetic driving portion 136 has a magnetized portion 158 that is provided coaxially with the inner ring 152 in a state of being fixed to the inner ring 152, and a magnetic generating portion 159 that is provided to oppose the magnetized portion 158.

Only the optical member 51 is provided in the distance D between the sensor module 41 and the lens unit 42, and the inner ring 152 that retains the optical member 51 and the magnetic driving portion 136 that drives this by a magnetic rotation force are provided outside the distance D. Generally, when the lens unit 42 has a plurality of lenses, the distance D is very small (for example, around 3 mm), and the distance D becomes much smaller as the capturing area becomes wide-angle. However, when only the optical member 51 is provided in the distance D, there is no problem with the positioning of the optical member 51 in the distance D.

Figure 21:
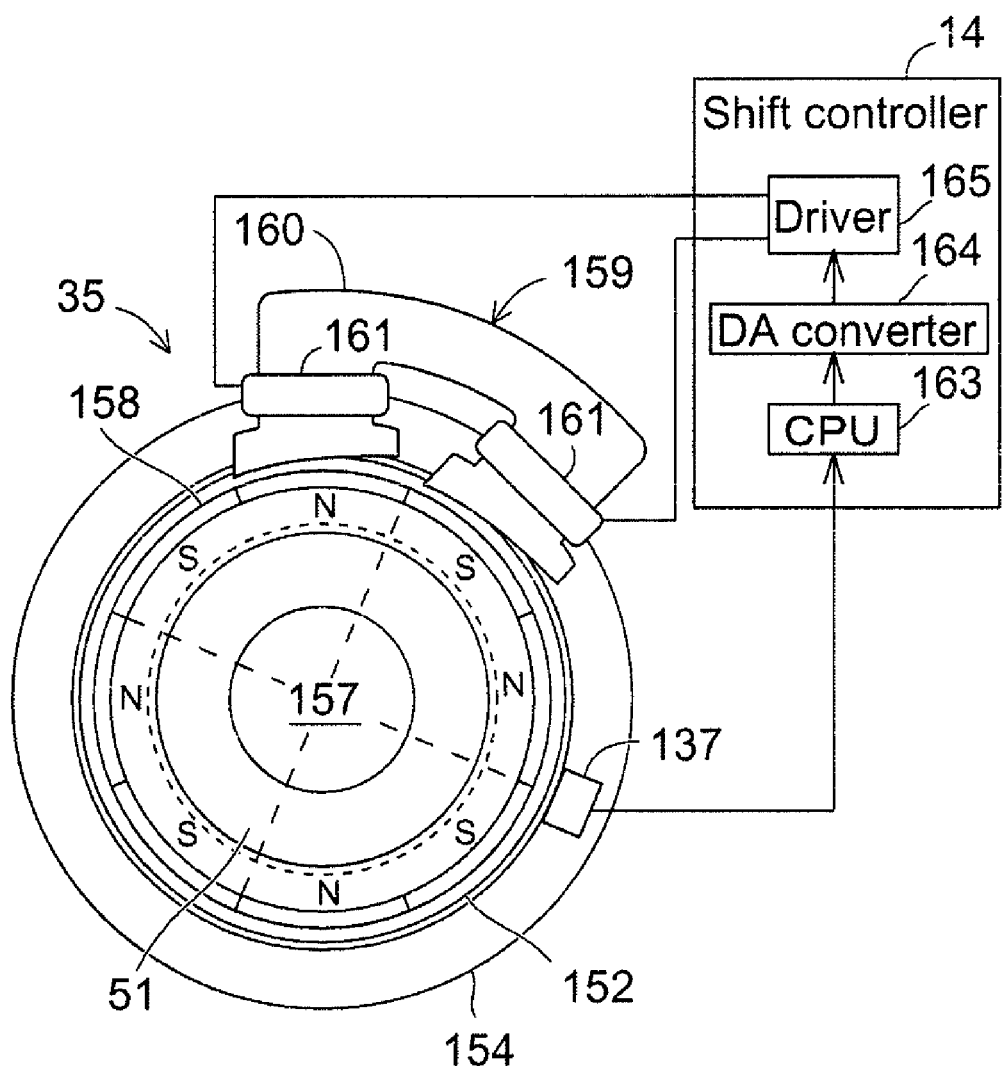
FIG. 21 is a plain view illustrating the optical shift mechanism of the image capturing portion shown in FIG. 20.

FIG. 21 is a plain view illustrating the optical shift mechanism of the image capturing portion 11. As shown in FIG. 21, the magnetized portion 158 is configured by providing a single rubber magnet having eight magnetic poles that are magnetized as an N pole and an S pole in the circumferential direction. The rubber magnet is made by dispersing and mixing minute magnetic particles in a rubber material. Ferrite, samarium cobalt, neodymium, or the like can be used as the magnetic particles. In the magnetic generating portion 159, a magnetic coil 161 is formed by coiling a lead wire around a stator core 160 where a plurality of electromagnetic steel tapes are layered. The stator core 160 is provided to oppose the magnetized portion 158. The magnetized portion 158 is rotated in a desired direction by attractive forces and repulsive forces of a magnetic field generated by causing electric current to flow through the magnetic coil 161, which causes the optical member 51 provided with the inner ring 152 and the parallel plate 157 to rotate around the optical axis. A plastic magnet may be used instead of the above-described rubber magnet. Such a plastic magnet can be manufactured by mold forming. Due to its accuracy with respect to the size, it is possible to reduce the spacing distance between the magnetized portion 158 and the magnetic generating portion 159, so as to efficiently generate the rotation force.

The magnetic sensor 137 that detects the rotation position of the inner ring 152 is provided so as to oppose the magnetized portion 158. The magnetic sensor 137 is constructed by a Hall element or the like. The magnetic sensor 137 detects magnetic forces generated by the magnetized portion 158 so as to output position information of the N poles and the S poles that are magnetic poles provided in the magnetized portion 158. In other words, when a pair of the N pole and the S pole move relative to the magnetic sensor 137, the magnetic sensor 137 outputs sine waves that make such movement one cycle. In sum, the magnetic sensor 137 outputs phase information of the magnetic poles provided in the magnetized portion 158.

The optical shift mechanism 35 having the above-described structure is controlled by the shift controller 14. When the above-described phase information is input to an analog port (not shown in the drawing) of a CPU 163 provided in the shift controller 14, the CPU 163 performs A/D conversion of the phase information therein so as to generate a digital value. Since the position relationship between the magnetic generating portion 159 and the magnetic sensor 137 is known (typically, the magnetic generating portion 159 and the magnetic sensor 137 are positioned in a position relationship of 90°, 180° or 270° with respect to the center of the inner ring 152), the CPU 163 provisionally determines driving electric current to flow through the coil 161 based on the position (phase) of the magnetic poles of the magnetized portion 158 with respect to the magnetic generating portion 159.

Further, the CPU 163 can detect a variation amount in the above-described phase per unit time such as about 10 ms or the like. Also, by causing the magnetic sensor 137 to output cosine waves that are behind by ¼ cycle with respect to a pair of magnetic poles as well as sine waves, it is possible to calculate a variation amount in the phase per unit time based on the ratio of the sine waves and the cosine waves (tangent) accurately (more strictly speaking, without being affected by variation in the spacing distance between the magnetic generating portion 159 and the magnetized portion 158). The variation amount in the phase has a "distance" dimension, and by dividing this by the unit time, the rotation speed (circumferential speed) of the inner ring can be calculated.

The CPU 163 corrects the provisionally determined driving current value by using a conventional method such as PI control (proportional-plus-integral control), determines a driving current value that causes the inner ring to rotate at a predetermined constant speed based on the calculated rotation speed, and outputs the value as a control signal. The control signal is converted into an analog level signal in a DA convertor 164 and passed to a driver 165, and a driving signal is output from the driver 165 to the magnetic generating portion 159. With this, the inner ring 152 and the optical member 51 are continuously rotated in one direction at a constant speed.

It is also possible to rotate the inner ring 152 and the optical member 51 at another constant speed by varying the target speed value to be used as a reference value in the P (proportional) computing of the PI control computing. With this, rotation control is performed at a speed designated by the period setter 25 (see FIG. 2).

As shown in FIG. 21, the spacing distance between the magnetized portion 158 and the magnetic generating portion 159 is not uniform along the outer periphery of the magnetized portion 158 but it is intentionally differentiated. With this, the resultant vector of forces acting on the magnetized portion 158 is allowed to have a circumferential component, which makes it possible to keep the rotation direction of the inner ring 152 constant.

In FIG. 21, the magnetic generating portion 159 is single, however, the number of the magnetic generating portion 159 may be increased according to the torque characteristics required by the optical shift mechanism 35. Also, according to the structure shown in FIG. 21, the torque is varied during rotation depending on the position relationship between the magnetic poles of the rubber magnet and the magnetic generating portion 159, which easily causes cogging (torque ripple). When speed variation due to cogging deteriorates super-resolution effects, two magnetic generating portions 159 may be provided, and the relationship between the magnetic poles that oppose the magnetic generating portions 159 may be adjusted.

Specifically, a second magnetic generating portion is provided along the outer periphery of the magnetized portion 158 in addition to the structure shown in FIG. 21. Assuming that a pair of the N pole and the S pole is one cycle of the magnetic poles, the phase of the magnetic poles that opposes the second magnetic generating portion is arranged to be shifted by ¼ cycle with respect to the magnetic poles that opposes the magnetic generating portion 159. In this manner, it is possible to substantially cancel the torque ripple caused by each of the magnetic generating portions 159.

Figure 22A:
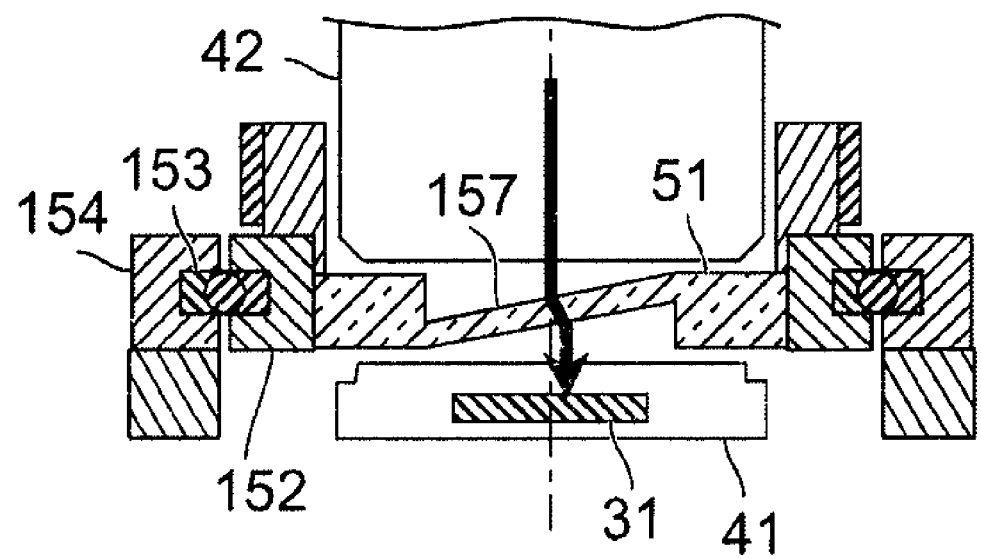
FIGS. 22A and 22B are cross-sectional views illustrating incidence statuses of light toward the image capturing element shown in FIG. 20.
Figure 22B:
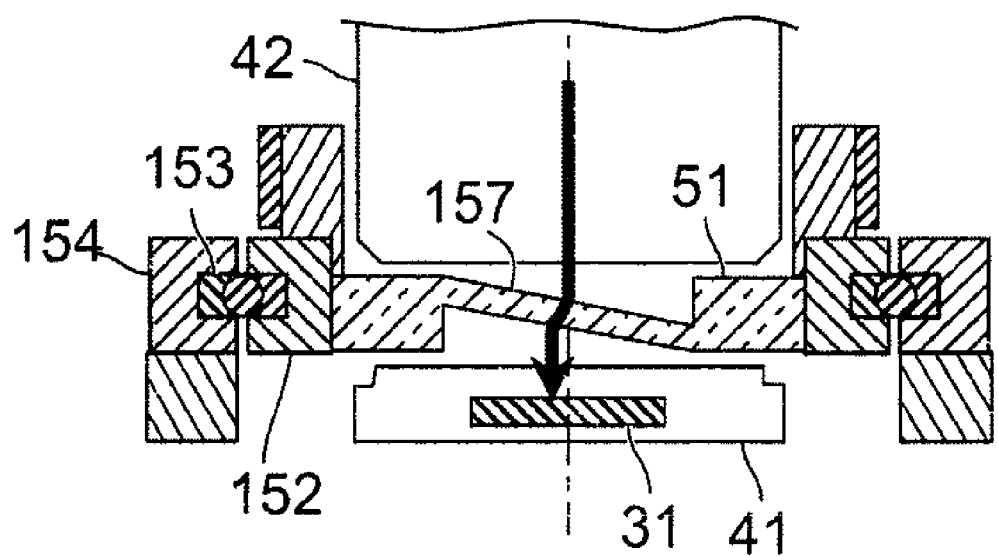

FIGS. 22A and 22B are cross-sectional views illustrating incidence statuses of light transmitted toward the image capturing element. FIG. 22A shows a state where the light path of the incident light is shifted to the right at a maximum, and FIG. 22B shows a state where the parallel plate 157 is rotated by 180 degrees from the state shown in FIG. 22A. When the parallel plate is further rotated by 180 degrees from the state shown in FIG. 22B, it returns to the state shown in FIG. 22A.

As shown in FIGS. 22A and 22B, the parallel plate 157 of the optical member 51 is inclined with respect to the optical axis of the lens unit 42, so as to refract incident light through the lens unit 42 and change the position of light incident upon the light-receiving surface of the image capturing element 31 depending on the rotation position of the parallel plate 157. When the optical member 51 is rotated by the optical shift mechanism 35, an optical image formed on the light-receiving surface of the image capturing element 31 moves as though a circle that is drawn in a period (circular motion period) that corresponds to the rotation speed of the optical member 51, which makes it possible to slightly displace the optical image relative to the image capturing element 31.

Specifically, in the present embodiment, an acrylic plate having a thickness of 0.1 mm and a refractive index of 1.49 is used as the parallel plate 157. The parallel plate 157 is inclined at an angle of 3.2 degrees with respect to the plane perpendicular to the optical axis. With this, light incident upon the parallel plate 157 is caused to shift by around 3.75 µm and is emitted while keeping its incident angle (i.e., in parallel), and an optical image formed on the image capturing element 31 moves so as to draw a circular orbit having a diameter of 7.5 µm by rotating the parallel plate 157.

Although the present invention has been described herein with reference to particular embodiments including examples, these embodiments are only illustrations and the present invention is not intended to be limited to these embodiments. All the elements of the image capturing device according to the embodiments of the present invention are not essential, and selection or omission is possible within the scope of the appended claims.

An image capturing device and a network camera system according to the present invention are useful as an image capturing device and a network camera system suitable for generating high-resolution images by performing super-resolution processing to a plurality of original images obtained by a pixel offset method, in which by reducing the effect of the angle variation of a parallel plate with respect to the optical axis on the optical shift amount, it is possible to achieve an optical shift mechanism having high accuracy, and image capturing is performed while an optical image formed on a light-receiving surface of an image capturing element is slightly displaced relative to the image capturing element.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications and combinations of the features of the various described embodiments may be possible without departing from the scope of the present invention.

What is claimed is:

1. An image capturing device comprising:
   an image capturing element that performs photoelectric conversion of light from an object and outputs a pixel signal;
   a lens unit that forms images on the image capturing element based on light from the object; and
   an optical shift mechanism that displaces optical images formed on a light-receiving surface of the image capturing element relative to the image capturing element,
   wherein the optical shift mechanism comprises an optical member, which is distinct from the lens unit,
   the optical member comprises a parallel plate that is inclined at a predetermined angle with respect to the optical axis of the lens unit and rotated around the optical axis, and
   the optical member is positioned within a fluid having a higher refractive index than a refractive index of air.

2. The image capturing device according to claim 1, wherein
the optical shift mechanism further comprises a radial magnet provided at an outer periphery of the optical member; and a magnetic rotation driving portion that rotates the optical member and the radial magnet such that the radial magnet and the optical member are not in contact with anything other than the fluid, by applying magnetic forces on the radial magnet.

3. The image capturing device according to claim 2, wherein
the optical shift mechanism further comprises a first axial magnet provided on the light-incident side of the optical member; a second axial magnet provided on the light-emitting side of the optical member; and a position controller that controls the position of the optical member by applying magnetic forces on the radial magnet, the first axial magnet, and the second axial magnet, respectively.

4. The image capturing device according to claim 3, wherein
the optical shift mechanism further comprises a capsule member filled with the fluid in which the optical member, the radial magnet, the first axial magnet, and the second axial magnet are received.

5. The image capturing device according to claim 4, wherein
the optical shift mechanism further comprises a sensor module in which the image capturing element is provided,
the capsule member is provided between the lens unit and the sensor module,
the light-incident surface of the capsule member abuts the lens unit, and
a space between the sensor module and the capsule member is sealed.

6. The image capturing device according to claim 3, wherein
at least one of the radial magnet, the first axial magnet, and the second axial magnet comprise a plastic magnet in which minute magnetic particles are dispersed and mixed in a resin material.

7. The image capturing device according to claim 1, wherein the fluid includes an anti-freeze solution.

8. The image capturing device according to claim 4, wherein
the optical shift mechanism further comprises a speed detector that detects the rotational speed of the optical member; and a position detector that detects the position of the optical member, and
at least one of the speed detector, the position detector, the magnetic rotation driving portion, and the position controller is attached to an outer wall of the capsule member.

9. The image capturing device according to claim 3, wherein
the position controller comprises a pair of axial magnetic force generators spaced in a parallel direction to the optical axis such that the first axial magnet and the second axial magnet are located between the pair of axial magnetic force generators, and
one of the axial magnetic force generators comprises a permanent magnet and the other of the axial magnetic force generators comprises an electromagnet.

10. The image capturing device according to claim 9, wherein the pair of axial magnetic force generators are connected by a non-magnetic connecting member.

11. The image capturing device according to claim 10, wherein
the connecting member is provided opposite the radial magnet, and
the position controller further includes a radial magnetic force generator that comprises a magnetic excitation coil coiled around the connecting member.

12. The image capturing device according to claim 8, wherein
the position detector further includes a radial magnetic sensor that detects the position of the optical member in a direction perpendicular to the optical axis based on the magnetism of the radial magnet, and
the speed detector detects the rotation speed of the optical member based on an output from the radial magnetic sensor.

13. The image capturing device according to claim 8, wherein
the position detector further includes an axial magnetic sensor that detects the position of the optical member in a direction of the optical axis based on the magnetism of at least one of the first axial magnet and the second axial magnet, and
the axial magnetic sensor is provided in the vicinity of the position controller.

14. The image capturing device according to claim 8, wherein
the position detector further includes a radial magnetic sensor that detects the position of the optical member in a radial direction perpendicular to the optical axis based on the magnetism of the radial magnet,
the position controller further includes a radial magnetic force generator that applies magnetic forces on the radial magnet so as to control the position of the optical member in the radial direction, and
the radial magnetic sensor and the radial magnetic force generator are provided in a position symmetric with respect to the optical axis.

15. The image capturing device according to claim 1, wherein the optical shift mechanism further comprises an origin sensor that detects the reference position of the optical member.

16. The image capturing device according to claim 1, further comprising:
a shift controller that causes the optical shift mechanism to perform circular motion of the optical image and the image capturing element relative to each other at a designated period; and
an image capturing controller that causes the image capturing element to perform image capturing at a designated period,
wherein the circular motion period by the optical shift mechanism is set to be non-integer times greater than the image capturing period by the image capturing element, and image capturing is performed by the image capturing element while the optical shift mechanism undergoes circular motion continuously in one direction at a constant speed.

17. The image capturing device according to claim 16, wherein
the image capturing element is a single-type element in which pixels are arranged based on a Bayer array, and
the diameter of the circular motion by the optical shift mechanism is set to be twice as large as the pixel pitch of the image capturing element.

18. The image capturing device according to claim 16, wherein the ratio of the circular motion period to the image capturing period is set such that the image capturing position returns to the original position in the second cycle of the circular motion by the optical shift mechanism.

19. A network camera system in which an image capturing device and an image processing device are connected with each other through a network, the image capturing device comprising:
   an image capturing element that performs photoelectric conversion of light from an object and outputs a pixel signal;
   a lens unit that forms images on the image capturing element based on light from the object; and
   an optical shift mechanism that displaces optical images formed on a light-receiving surface of the image capturing element relative to the image capturing element,
   wherein the optical shift mechanism comprises an optical member, which is distinct from the lens unit,
   the optical member comprises a parallel plate that is inclined at a predetermined angle with respect to the optical axis of the lens unit and rotated around the optical axis, and
   the optical member is positioned within a fluid having a higher refractive index than a refractive index of air.

20. The network camera system according to claim 19, wherein the image capturing device further comprising:
   a shift controller that causes the optical shift mechanism to perform circular motion at a designated period;
   an image capturing controller that causes the image capturing element to perform image capturing at a designated period; and
   a transmitter that transmits frame images sequentially generated by image capturing by the image capturing element to the image processing device,
   wherein the image processing device further comprising:
   a receiver that receives frame images transmitted from the image capturing device; and
   a super-resolution processor that generates high-resolution images from a plurality of frame images received by the receiver, and
   wherein, in the image capturing device, the circular motion period by the optical shift mechanism is set to be non-integer times greater than image capturing period by the image capturing element, and image capturing is performed by the image capturing element while the optical shift mechanism is continuously driven in circular motion in one direction at a constant speed.

* * * * *